United States Patent
Uesaki et al.

(10) Patent No.: US 6,828,971 B2
(45) Date of Patent: Dec. 7, 2004

(54) ANIMATION DATA GENERATION APPARATUS, ANIMATION DATA GENERATION METHOD, ANIMATED VIDEO GENERATION APPARATUS, AND ANIMATED VIDEO GENERATION METHOD

(75) Inventors: Akira Uesaki, Takatsuki (JP); Yoshiyuki Mochizuki, Suita (JP); Toshiki Hijiri, Hirakata (JP); Shigeo Asahara, Ikeda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 236 days.

(21) Appl. No.: 10/119,158

(22) Filed: Apr. 10, 2002

(65) Prior Publication Data

US 2002/0149622 A1 Oct. 17, 2002

(30) Foreign Application Priority Data

Apr. 12, 2001 (JP) ........................................ 2001-113668

(51) Int. Cl.7 .............................................. G06T 13/00
(52) U.S. Cl. ...................... 345/473; 345/474; 345/475; 345/467; 345/468; 345/469; 345/470
(58) Field of Search ................................ 345/467–475, 345/685

(56) References Cited

U.S. PATENT DOCUMENTS 5,729,471 A * 3/1998 Jain et al. .................... 725/131
6,662,177 B1 * 12/2003 Martino et al. ................ 707/3
2001/0035865 A1 * 11/2001 Utterback et al. .......... 345/474

OTHER PUBLICATIONS

Al Barr, "Physically–Based Modeling for Computer Graphics", Chapter 13, pp. 254–265.

* cited by examiner

Primary Examiner—Mark Zimmerman
Assistant Examiner—Adam Arnold
(74) Attorney, Agent, or Firm—Wenderoth, Lind & Ponack, L.L.P.

(57) ABSTRACT

An animation data generation apparatus that supplies a state where a character string can be read in a part of 3D character animation generated based on functions. The apparatus includes an interface unit for setting characters which are used for animation, time allocation between 3D character animations in a moving standstill state, and the type of the animation in the moving state. The apparatus also includes a calculation unit for calculating the number of frames corresponding to animation based on the time allocation, and a generation unit for generating animation data in the standstill state so that 3D characters corresponding to the set characters can be read, and for generating data of the 3D character animation in a moving state so as to link to the data of the animation in the standstill state by using the number of calculated frames and a function corresponding to the set animation.

22 Claims, 15 Drawing Sheets

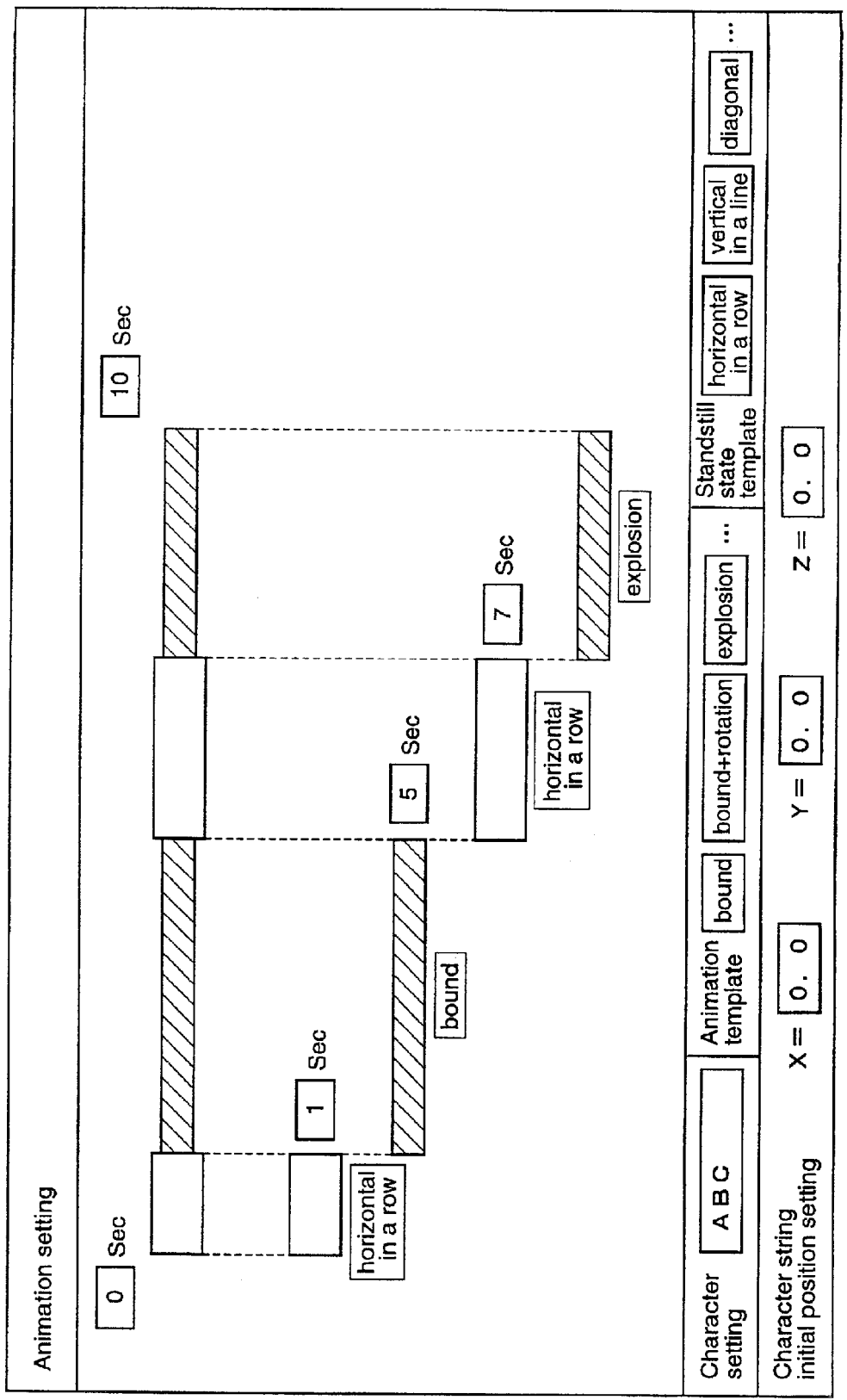

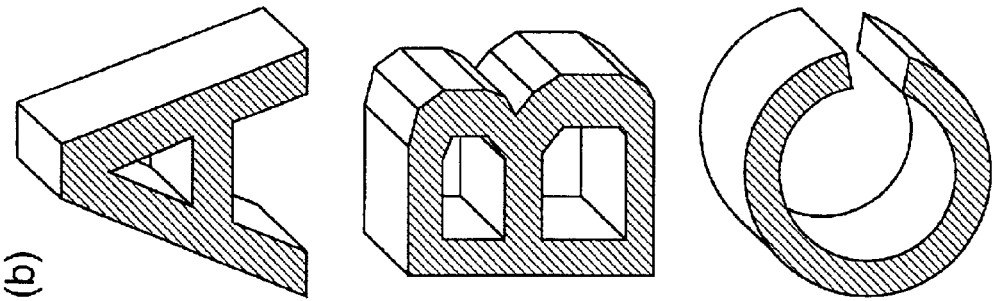
Fig.5(b)
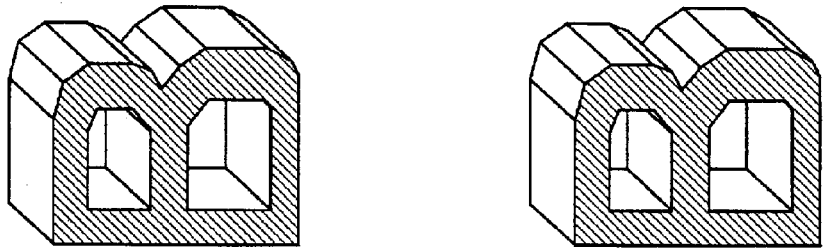
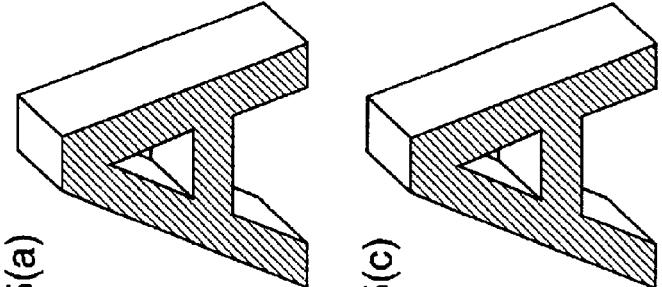
Fig.5(a)
Fig.5(c)

ANIMATION DATA GENERATION APPARATUS, ANIMATION DATA GENERATION METHOD, ANIMATED VIDEO GENERATION APPARATUS, AND ANIMATED VIDEO GENERATION METHOD

FIELD OF THE INVENTION

The present invention relates to an animation data generation apparatus and an animation data generation method for generating animation data of 3D characters comprising 3D shapes, and an animated video generation apparatus and an animated video generation method for generating animated video of 3D characters.

BACKGROUND OF THE INVENTION

Fundamental techniques of common animation technology in the 3D computer graphics (hereinafter abbreviated as 3DCG) are described, for example, in "Introduction to High Technology Series: 3DCG", supervised by Masayuki Nakajima, edited by Institute of Image Information and Television Engineers, Ohm-sha, 1994. This reference explains the animation technology that has been used in the 3DCG world.

The most important point in the animation employing character strings having 3D shapes, which are used as titles in the 3DCG or the like, is that a period during which the character strings are readable, i.e., the character strings having 3D shapes are standing still (stationary) and the respective characters are positioned so as to be read by the readers, should exist during the animation. When the readers who read generated animated video cannot grasp the meaning of the character strings, such animated video has a fatal defect as 3D animation, especially in the case of titlers. If the character strings of the animated video cannot be read at all, the animated video of 3D characters makes no sense.

In the conventional 3DCG, a technique of generating animation by using a key frame has been employed. In this case, by using an image of the character strings in a readable state as the key frame, a state where the character strings are readable is provided to the readers also in the case of 3D character animation.

However, this technique of generating animation by using the key frames is not suitable for the generation of animation corresponding to motions like a ball bounding (bouncing) i.e., such animation in which a motion of an object that is moved by animation is complicated and the speed of the motion varies during the movement. If the motion of a bounding ball is represented by animation of the key frames, there is a risk that the motion may become jerky. In order to represent the motion of such animation smoothly by using the key frames, more key frames than usual should be employed, and thus, operations of animation creators become complicated and the workability is decreased.

To solve this problem, a technique of generating animation on the basis of a predetermined function, such as a physical function (i.e., a function that employs the fundamental rules of physics), has also been developed. In cases where animation is generated on the basis of this function, the key frames are not employed and, accordingly, the motion of the animation becomes smooth. For example, principles of 3DCG animation based on mathematical-physical models are described in "PHYSICALLY-BASED MODELING FOR COMPUTER GRAPHICS: A Structured Approach", written by Ronen Barzel, ACADEMIC PRESS, INC., 1992. This reference includes a description of kinematic animation, while this is like a handbook for the physics of rigid body dynamics rather than the 3DCG animation technique. When animation having a motion like a bounding ball is to be generated, a function corresponding to the motion of the ball is set and the animation is generated on the basis of the function, whereby animation having a smooth motion can be generated.

However, when animation of 3D characters is generated by using this technique of generating animation on the basis of the functions, each of the characters freely moves according to the functions, and therefore, there may be a situation in which the reader cannot read the characters. As already mentioned, when the readers who read the generated animated video cannot grasp the meaning of the character strings, such animation of 3D-shaped character strings has a fatal defect.

Further, being able to control a position in which animated video of a title is spread with respect to the main video, i.e., video with which the title is to be composed, and a position in which the title is readable are important technical factors in 3D character animation. When the state where the title is readable appears in an important part of the main video (for example, a face part of a hero or a heroin), even if the title is readable, this is not a suitable method for composing the animated video of the title and the main video. Further, when the position in which the 3D characters are spread is decided manually, larger burdens are put upon the operators, whereby the workability is decreased.

SUMMARY OF THE INVENTION

An object of the present invention is to provide an animation data generation apparatus and method which can realize a readable state of 3D characters during a period corresponding to a part of an animation even when animation data of the 3D characters' is generated on the basis of functions.

Another object of the present invention is to provide an animated video generation apparatus and method which supplies the readers a state where 3D characters are readable by the readers during a period corresponding to a part of an animation even when animated video of the 3D characters is generated on the basis of functions.

A further object of the present invention is to provide an animated video generation apparatus and method which can properly compose animated video of 3D characters with the main video.

Other objects and advantages of the present invention will become apparent from the following detailed description. Specific embodiments which are described are provided only for illustration since various additions and modifications within the spirit and scope of the invention will be apparent to those of skill in the art from the detailed description.

According to a first aspect of the present invention, there is provided an animation data generation apparatus comprising: an interface unit for setting a time allocation between 3D character animations in a moving state and in a standstill state, and a type of the animation in the moving state; a number-of-frame calculation unit for calculating the number of frames corresponding to the animation on the basis of the time allocation between animations which is set by the interface unit; and an animation data generation unit for generating data of the animation in the standstill state so that the 3D characters can be read, and for generating data of the 3D character animation in the moving state so as to link to the animation data in the standstill-state by using the number of frames calculated by the number-of-frame calculation unit and a function corresponding to the type of the animation in the moving state set by the interface unit. Therefore, even when 3D character animation data is generated on the basis of the function, states where the 3D characters are readable can be supplied during a period corresponding to a standstill state of the animation. Further, since the interface unit performs the time allocation to the standstill state, the state in which the 3D characters are readable can be set in a period that is designated by the users.

According to a second aspect of the present invention, in accordance with the animation data generation apparatus of the first aspect, the interface unit also sets characters which are used in animation, and the animation data generation unit generates the animation data by using 3D character data corresponding to the set characters. Therefore, a 3D character animation of a desired character string can be generated.

According to a third aspect of the present invention, the animation data generation apparatus of the second aspect further comprises a 3D character generation unit for generating 3D character data corresponding to the characters which are set by the interface unit. The animation data generation unit generates the animation data by using the 3D character data which is generated by the 3D character generation unit. Therefore, a 3D character animation can be generated for not only previously prepared 3D characters but also for arbitrary characters.

According to a fourth aspect of the present invention, the animation data generation apparatus of the second aspect further comprises a storage unit which has a table including the characters which are set by the interface unit and the 3D character data of the set characters in a correspondence with each other. The the animation data generation unit generates the animation data by using the 3D character data stored in the storage unit. Therefore, the 3D character generation unit of the third aspect is not required, and 3D character animation can be generated for arbitrary characters with a simple structure. The present invention is especially suitable for cases where 3D character animation is generated only for alphabets, i.e., where the number of characters to be employed is small.

According to a fifth aspect of the present invention, in accordance with the animation data generation apparatus of the first aspect, the interface unit sets the type of animation by using templates. Therefore, the animation type can be easily set.

According to a sixth aspect of the present invention, in accordance with the animation data generation apparatus of the first aspect, the interface unit also sets an arrangement of 3D characters in the standstill state, and the animation data generation unit generates the animation data in the standstill state on the basis of the set arrangement of the 3D characters in standstill. Therefore, the animation data can be generated with more detailed setting.

According to a seventh aspect of the present invention, in accordance with the animation data generation apparatus of the sixth aspect, the interface unit sets the arrangement of 3D characters in the standstill state by using templates. Therefore, the arrangement of 3D characters in standstill states can be easily set.

According to an eighth aspect of the present invention, in accordance with the animation data generation apparatus of the first aspect, the animation data generation unit generates the animation data by using a physical function as a function corresponding to the type of the animation. Therefore, an animation based on the physical rules, which are difficult to generate using key frames, can be easily generated. Further, states where 3D characters are readable can be supplied during a period corresponding to a standstill state of the animation.

According to a ninth aspect of the present invention, in accordance with the animation data generation apparatus of the first aspect, the animation data generation unit generates the animation data by using a function corresponding to at least one process among scaling, translating, and rotation. Therefore, an animation corresponding to at least one process among scaling, translating and rotation can be generated, and states where 3D characters are readable can be supplied during a period corresponding to the standstill state of the animation.

According to a tenth aspect of the present invention, in accordance with the animation data generation apparatus of the first aspect, the animation data generation unit generates the animation data for each character. Therefore, an animation which includes characters each having a different motion can be generated, whereby animation that excites the readers' interests can be generated.

According to an eleventh aspect of the present invention, accordance with in the animation data generation apparatus of the first aspect, the animation data generation unit generates the animation data for each of the individual parts of each character or for each group of characters. Therefore, animation data in which each of the individual parts of each character or each group of characters moves differently can be generated. For example, when the number of characters is small, animation data is generated for each of the individual parts of each character, whereby animation having a more complicated motion can be generated. On the other hand, when the number of characters is large, animation data is generated for each group of characters, thereby preventing the animation from being too complicated.

According to a twelfth aspect of the present invention, in accordance with the animation data generation apparatus of the first aspect, the interface unit receives speech input, and sets the type of the animation in the moving state on the basis of the speech input. Therefore, the animation type or the like can be set by speech. More particularly, for some speech input, an animation type that is judged to be the closest to the speech input is selected, whereby the user can enjoy an animation which is set for an onomatopoeic word or a mimetic word that has been freely input by the user, and, accordingly, an interface that excites the users' interests can be supplied.

According to a thirteenth aspect of the present invention, there is provided an animation data generation method comprising: a setting step of setting a time allocation between 3D character animations in a moving state and in a standstill state, and a type of the animation in the moving state; a number-of-frame calculating step of calculating the number of frames corresponding to the animation on the basis of the set time allocation between the animations; and an animation data generation step of generating data of the animation in the standstill state so that 3D characters can be read, and generating data of the 3D character animation in the moving state so as to link to the data of the animation in the standstill state by using the number of frames that are calculated in the number-of-frame calculation step and a function corresponding to the type of the animation set in the setting step. Therefore, even when 3D character animation data is generated on the basis of the function, states where the 3D characters are readable can be supplied during a period corresponding to a standstill state of the animation. Further, since the setting step performs the time allocation to the standstill state, the state in which the 3D characters are readable can be set in a period designated by the users.

According to a fourteenth aspect of the present invention, there is provided a computer-readable program storage medium that contains a program for making a computer execute: a setting step of setting a time allocation between 3D character animations in a moving state and in a standstill state, and a type of the animation in the moving state; a number-of-frame calculating step of calculating the number of frames corresponding to the animation on the basis of the set time allocation between the animations; and an animation data generation step of generating data of the animation in the standstill state so that 3D characters can be read, and generating data of the 3D character animation in the moving state so as to link to the data of the animation in the standstill state by using the number of frames calculated in the number-of-frame calculation step and a function corresponding to the type of the animation set in the setting step. Therefore, even when 3D character animation data is generated on the basis of the function, states where the 3D characters are readable can be supplied during a period corresponding to a standstill state of the animation. Further, since the setting step performs the time allocation to the standstill state, the state in which the 3D characters are readable can be set in a period designated by the users.

According to a fifteenth aspect of the present invention, there is provided an animated video generation apparatus comprising: an interface unit for setting a time allocation between 3D character animations in a moving state and in a standstill state, and a type of the animation in the moving state; a number-of-frame calculation unit for calculating the number of frames corresponding to the animation on the basis of the time allocation between the animations set by the interface unit; an animation data generation unit for generating data of the animation in the standstill state so that 3D characters can be read, and generating data of the 3D character animation in the moving state so as to link to the data of the animation in the standstill state by using the number of frames calculated by the number-of-frame calculation unit and a function corresponding to the type of the animation in the moving state set by the interface unit; a characteristic amount calculation unit for calculating a characteristic amount as an amount which is characteristic of the 3D character animation; a camera control unit for calculating a position and a posture of a camera with respect to the animation data based on the characteristic amount so that the 3D character animation in the standstill state can be read; and a rendering unit for generating animated video of 3D characters by using the camera position and posture calculated by the camera control unit and the animation data. Therefore, animated video of 3D characters in the standstill state can be generated so that the 3D characters can be read.

According to a sixteenth aspect of the present invention, in accordance with the animated video generation apparatus of the fifteenth aspect, the camera control unit calculates the camera position and posture by using coordinates and a posture vector of the 3D characters in the standstill state. Therefore, 3D characters can be read in animated video of the 3D characters in a predetermined standstill state.

According to a seventeenth aspect of the present invention, in accordance with the animated video generation apparatus of the fifteenth aspect, the camera control unit calculates a position and a posture of the camera by using coordinates and posture vectors of the 3D characters in plural standstill states for each of the standstill states, and calculates a position and a posture of the camera in the moving state by using a function for interpolating the camera positions and postures of the plural standstill states. Therefore, animated video of 3D characters can be generated so that the 3D characters can be read in each standstill state. Further, a more complicated path over which the camera moves between the adjacent standstill states can be set.

According to an eighteenth aspect of the present invention, in accordance with the animated video generation apparatus of the fifteenth aspect, the camera control unit calculates a position and a posture of the camera by using coordinates and posture vectors of 3D characters in plural standstill states for each of the standstill states, and calculates a position and a posture of the camera in the moving state by using a function that is optimized by using an objective function based on generated animated video. Therefore, animated video of 3D characters can be generated so that the 3D characters can be read in each standstill state. Further, a path over which the camera moves between the adjacent standstill states can be set automatically and more properly.

According to a nineteenth aspect of the present invention, the animated video generation apparatus of the fifteenth aspect further includes a composition unit for composing the 3D character animated video that is generated by the rendering unit upon a predetermined area of main video. Therefore, the main video and the animated video of 3D characters can be properly composed.

According to a twentieth aspect of the present invention, in accordance with the animated video generation apparatus of the nineteenth aspect, the composition unit composes the 3D character animated video upon an area of the main video other than an area which is not desirable to be obstructed by the 3D character animated video. Therefore, the 3D character animated video can be prevented from overlapping important parts in the main video, and the 3D character animated video and the main video can be properly composed.

According to a twenty-first aspect of the present invention, there is provided an animated video generation method comprising: a setting step of setting a time allocation between 3D character animations in a moving state and in a standstill state, and a type of the animation in the moving state; a number-of-frame calculation step of calculating the number of frames corresponding to the animation on the basis of the time allocation between the animations set in the setting step; an animation data generation step of generating data of the animation in the standstill state so that 3D characters can be read, and generating data of the 3D character animation in the moving state so as to link to the animation data in the standstill state by using the number of frames calculated in the number-of-frame calculation step and a function corresponding to the type of the animation set in the setting step; a characteristic amount calculation step of calculating a characteristic amount as an amount which is characteristic of the 3D character animation; a camera control step of calculating a position and a posture of a camera with respect to the animation data based on the characteristic amount so that the 3D character of the animation in the standstill state can be read; and a rendering step of generating 3D character animated video by using the camera position and posture calculated in the camera control step and the animation data. Therefore, animated video of 3D characters in the standstill state can be generated so that the 3D characters can be read.

According to a twenty-second aspect of the present invention, there is provided a computer-readable program storage medium that contains a program for making a computer execute: a setting step of setting a time allocation between 3D character animations in a moving state and in a standstill state, and a type of the animation in the moving state; a number-of-frame calculation step of calculating the number of frames corresponding to the animation on the basis of the time allocation between the animations set in the setting step; an animation data generation step of generating data of the animation in the standstill state so that 3D characters can be read, and generating data of the 3D character animation in the moving state so as to link to the animation data in the standstill state by using the number of frames calculated in the number-of-frame calculation step and a function corresponding to the type of the animation set in the setting step; a characteristic amount calculation step of calculating a characteristic amount as an amount which is characteristic of the 3D character animation; a camera control step of calculating a position and a posture of a camera with respect to the animation data based on the characteristic amount so that the 3D character of the animation in the standstill state can be read; and a rendering step of generating 3D character animated video by using the camera position and posture calculated in the camera control step and the animation data. Therefore, animated video of 3D characters in the standstill state can be generated so that the 3D characters can be read.

BRIEF DESCRIPTION OF THE DRAWINGS

FIG. 3 is a diagram showing an example of a display on an interface unit according to the first embodiment.

FIGS. 5(a) to 5(c) are diagrams for explaining states where 3D characters are standing still.

DETAILED DESCRIPTION OF THE INVENTION

First Embodiment

Figure 1:
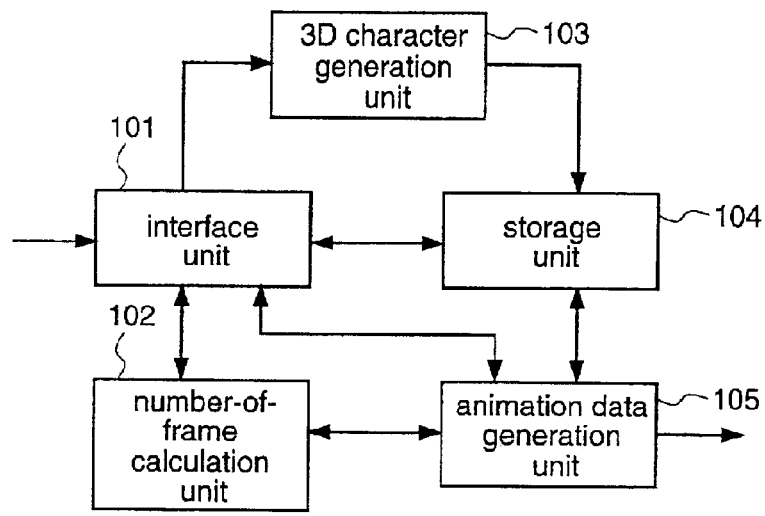
FIG. 1 is a block diagram illustrating a structure of an animation data generation apparatus according to a first embodiment of the present invention.

FIG. 1 is a block diagram illustrating the structure of an animation data generation apparatus according to a first embodiment of the present invention.

In FIG. 1, the animation data generation apparatus according to the first embodiment includes an interface unit 101, a number-of-frame calculation unit 102, a 3D character generation unit 103, a storage unit 104, and an animation data generation unit 105.

The interface unit 101 sets characters which are used in animation, time allocation between a moving state and a standstill stationary state of 3D character animation, and a type of the animation in the moving state in accordance with a user's input. The number-of-frame calculation unit 102 calculates the number of frames corresponding to the animation on the basis of the time allocation between animations, which is set by the interface unit 101. The 3D character generation unit 103 generates 3D characters corresponding to the characters which are set by the interface unit 101. The storage unit 104 stores a function corresponding to the type of the animation in a moving state, an arrangement of the characters in a standstill state, the 3D characters that are generated by the 3D character generation unit 103, and the like.

The animation data generation unit 105 generates data of the animation in standstill so that the 3D characters can be read, and generates data of the animation of 3D characters in moving state so as to link to the animation data in standstill by using the number of frames that are calculated by the number-of-frame calculation unit 102 and the function corresponding to the type of the animation which is set by the interface unit 101.

Next, the operation of the animation data generation apparatus according to the first embodiment will be described.

Figure 2:
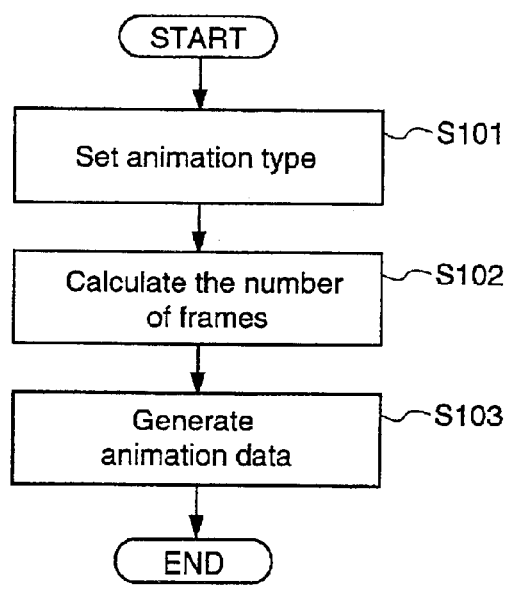
FIG. 2 is a flowchart for explaining an operation of the animation data generation apparatus according to the first embodiment.

FIG. 2 is a flowchart for explaining the operation of the animation data generation apparatus according to the first embodiment.

Initially, the interface unit 101 supplies environments for setting parameters which are required to generate desired 3D character animation, thereby setting the type of the animation and the like (step S101).

FIG. 3 is a diagram illustrating an example of a display on the interface unit 101. On the animation setting window, a time allocation between animations, and a setting of character strings which are translated, rotated or scaled in 3D animation and the type of animation is carried out. The time allocation between animations is performed by setting the total time of animation (start time and end time), and setting time periods of animations in moving states and in standstill states. Initially, a positive number is inputted into the top edit box to decide the total time of animation. In a specific example as shown in FIG. 3, the total time of animation is decided to be 10 sec. Next, the total animation time is divided into several sections, thereby allocating the time between moving states and standstill states of the animation. Here, the moving state refers to a state where 3D characters are translated, rotated, scaled or the like, and the moving states are shown by hatched bars in FIG. 3. The standstill state refers to a state where 3D characters are not translated or the like but are instead standing still (stationary), and the standstill states are shown by hollow bars in FIG. 3. The time allocation may be set in frame units. Further, the time allocation to animation may be set by inputting a value corresponding to the end time into a text box that is displayed on the right end of each section. Alternatively, the time allocation to animation may be set by changing the length of the bar indicating each section by employing a device such as a mouse (not shown).

Figure 4A:
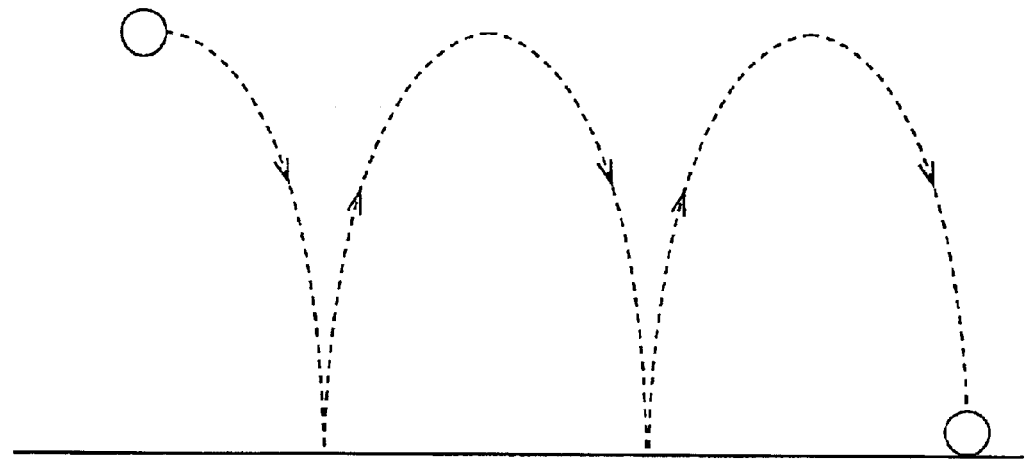
FIGS. 4(a) and 4(b) are diagrams for explaining types of animation.
Figure 4B:
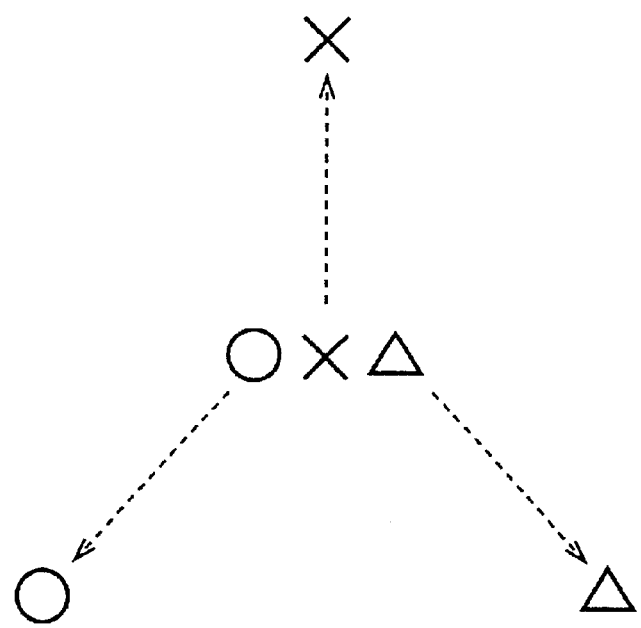

Next, by employing this animation setting window, the types of animation in the moving states are also set. A desired animation is selected from a group of several animation template buttons, and a divided section in which the selected animation is to be implemented is designated. In addition, as for the standstill states, standstill state templates which indicate several kinds of states are prepared, and a standstill state which is to be implemented is designated in the same manner as in the case of animation. In FIG. 3, "bound", "bound+rotation", "explosion" and the like are set as the animation templates, and "horizontal in a row", "vertical in a line", "diagonal" and the like are set as the standstill states. Here, "bound" refers to an animation by which characters vary like a ball bounding (bouncing) on a floor as shown in FIG. 4(a). "Bound+rotation" refers to an animation by which characters are rotating while bounding. "Explosion" refers to an animation by which character strings that are initially fixed are scattered in different directions, respectively, as shown in FIG. 4(b). Further, "horizontal in a row", "vertical in a line" and "diagonal" refer to standstill states of arranged character strings as shown in FIGS. 5(a) to 5(c), respectively.

Further, also with this animation setting window, characters which are used for the 3D character animation are set. This setting of characters is performed by inputting desired characters into a character setting box by means of a keyboard or the like. In FIG. 3, "ABC" is inputted.

For example, it is possible to select a standstill state template in which characters are arranged horizontally (FIG. 5(a)) as an initial state, and to select another standstill state template in which the characters are arranged vertically (FIG. 5(b)) after the moving state. However, the characters which are arranged horizontally in the initial standstill state cannot be arranged vertically only by the rotational animation. Therefore, the moving state between these standstill states cannot be set as an animation of only rotation. Further, it is impossible to generate animation of rotation with one frame allocation. Thus, once a standstill state is decided, templates for a moving state are restricted, and, conversely, once a moving state is decided, templates for a standstill state are restricted. Besides, it is also important to check whether the designated type of animation is producible or not during the allocated time (the number of frames). Therefore, the interface unit 101 monitors the selected states and carries out a process for preventing the users from selecting impracticable animation templates or standstill templates.

The process of the time allocation for animation and the process of the selection of the types of animation in the moving states may be carried out in the reverse order.

If required, the position of the character string in the initial state of the animation, i.e., character string initial position, may be set. The character string initial position is defined by a global coordinate system and indicates the initial position corresponding to the center of the character string. Here, the global coordinate system refers to a coordinate system in a 3D kinematic space, where 3D characters are translated, rotated, or the like. The origin of the character string initial position is set at a prescribed reference point in the 3D space. Here, when the character string initial position is not particularly set, the default values (X, Y, Z)=(0, 0, 0).

In this first embodiment, the types of the animation in the moving state or the arrangement of characters in the standstill state are set by using the templates. However, the types of the animation and the character arrangement may be set without using templates. For example, the types of the animation may be set directly by using functions, or the character arrangement may be set by using specific coordinate values.

As for the arrangement of characters in the standstill state, it is possible to set "horizontal in a row" as a default and then use templates only when setting other arrangements.

The number-of-frame calculation unit 102 calculates the respective numbers of frames for animation in the standstill and the moving states on the basis of the time that is allocated to the animation, which has been set by the interface unit 101 (step S102). The calculation of the number of frames is carried out by initially calculating time periods corresponding to the animation in the standstill and the moving states, and converting the calculated time periods into the numbers of frames. For example, the "bound" animation shown in FIG. 3 is displayed from the 1st to the 5th sec. Thus, assuming that one second comprises 30 frames, the "bound" animation is calculated as frames corresponding to four seconds, i.e., 120 frames. The number-of-frame calculation unit 102 sends the numbers of frames which have been calculated as described above to the animation data generation unit 105.

Figure 6:
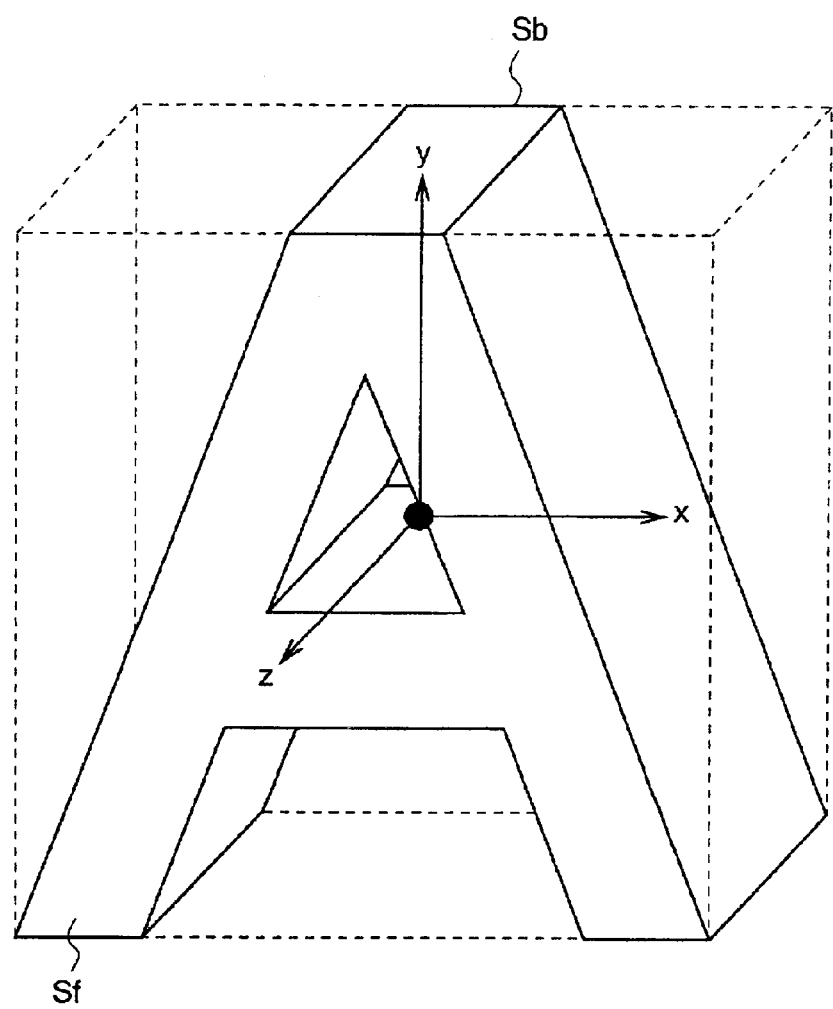
FIG. 6 is a diagram for explaining an example of a 3D character.

The 3D character generation unit 103 receives the characters which are set by the interface unit 101, and converts the set characters into 3D images. FIG. 6 is a diagram illustrating an example of a 3D image of character "A". Here, converting a character into a 3D image refers to setting the width, height, and depth of the character as prescribed lengths in the global coordinate system, and further refers to setting a shape boundary box and a local coordinate system corresponding to each character. Here, the shape boundary box means a rectangular parallelepiped box into which the 3D character is tightly fitted, and this is shown by dotted lines in FIG. 6. Further, the local coordinate system means a coordinate system that is defined so that a cross section which is taken along the x-y plane originating at the center of mass of the shape boundary box is a two-dimensional image of the character and that the z axis is orientated in the depth direction (direction of thickness) of the character. As shown in FIG. 6, there are two planes which are parallel to the x-y plane. Among these planes of the shape boundary box, the plane having a larger z coordinate value is assumed to be a surface SF while the other surface (plane) is assumed to be a back surface Sb. Planes other than these surfaces are assumed to be side surfaces. Data of the 3D character generated in this manner is given to the storage unit 104 and stored therein. When plural characters are to be converted into 3D images, data corresponding to each of the 3D characters is stored in the storage unit 104.

The apparatus according to the first embodiment is provided with the 3D character generation unit 103. Alternatively, instead of the 3D character generation unit 103, a memory that stores a table including text data of characters and 3D character data corresponding to the text data of the characters in a one-to-one relationship can be prepared, and then, the animation data generation unit 105 can employ the 3D character data in table stored in such a memory.

The storage unit 104 also contains, in addition to data of the 3D character which are generated by the 3D character generation unit 103, functions corresponding to the types of the animation in the moving states supplied by this animation data generation apparatus, the arrangement of the characters in the standstill state corresponding to the standstill state templates, and the like.

The animation data generation unit 105 receives the time allocation to each animation, the type of animation in a moving state, the arrangement of 3D characters in the standstill state, and the characters used in the animation from the interface unit 101. Since the type of the animation that is designated by the animation template corresponds to a function or a group of functions which are used to generate animation data, in a one-to-one relationship, a function corresponding to the type of the animation in the moving state is extracted from the storage unit 104. In addition, data of 3D characters corresponding to the characters which are used in the animation is extracted from the storage unit 140. Further, the numbers of frames corresponding to the animation in the moving state and the standstill state are given from the number-of-frame calculation unit 102. Then, on the basis of these data, animation data is generated (step S103).

The typical procedure for generating animation data is as follows:

(1) Initially, animation data in the standstill state is generated on the basis of an arrangement of 3D characters in the standstill state and shape boundary boxes of the 3D characters. For example, when the assignment of animation is performed as shown in FIG. 3, positional coordinates of each character in the standstill state are first calculated, thereby generating animation data in the first standstill state in which the characters are arranged horizontally in a row. Since 3D characters of the animation data in the standstill state should be in a readable state, the animation data generation unit 105 arranges the 3D characters horizontally side-by-side, leaving a space of a predetermined distance therebetween, so that the z axes of the respective local coordinate systems corresponding to the 3D characters which are obtained from the storage unit 104 point almost in the same direction and the adjacent shape boundary boxes do not overlap with each other, thereby generating animation data in the standstill state. As data in the standstill state, the length of the animation data is generated so as to correspond to the number of frames which are received from the number-of-frame calculation unit 102. Here, it is only required that the animation data in the standstill state should be in a readable state. Therefore, the surfaces Sf of the shape boundary boxes corresponding to the respective 3D characters may be on different planes. For example, in the case shown in FIG. 5(a), it can be assumed that "A" is located nearest to the lefthand side, and the origin of the local coordinate system of "B" has a negative z coordinate value in the local coordinate system of "A", and "C" is located at a more negative position on the z axis with respect to "B". That is, the example of FIG. 5(a) in, "A" is located nearest to the lefthand side and "C" is located farthest from the lefthand side, while the characters "ABC" are in a readable state.

(2) Next, as for the function corresponding to the type of animation, parameters of the function are decided on the basis of given conditions such as the number of frames that are received from the number-of-frame calculation unit 102, and the number of characters. The parameters of the function are also decided on the basis of restraint conditions for linking an animation in a moving state to the position and posture (angle of rotation) of the characters in the standstill state. Here, parameters that cannot be decided on the basis of the given conditions, i.e., parameters which can be arbitrarily, set are decided according to predetermined rules or by generating random numbers.

(3) Finally, a value of the function corresponding to each frame time is calculated on the basis of the decided parameters, thereby generating animation data of the respective 3D characters that constitute the 3D character string.

Fundamental factors of animation are scaling, translating and rotation, and many complicated animations can be realized by combining these factors. Hereinafter, generation of these three types of animation will be described.

Initially, the generation of a scaled animation is described.

In the case of a scaling animation, a ratio for scaling 3D characters in the axial direction is generated as data. As functions that are used for the scaling, there are a linear function, a quadratic function, a trigonometric function, and the like. Since different scaling animations can be generated by using different functions, it may be possible to define plural scaling animation templates. Descriptions are given here of one animation in which the total number of frames is TFRM, characters are magnified a times in the x-axis direction in a period corresponding to the number of frames FRM starting from the frame time TR using the linear function, and then the characters are kept in the scaled states for the remaining frames. In this case, the frame time t and the corresponding scaling values (sx, sy, sz) at that time have the following relationship.

Figure 7A:
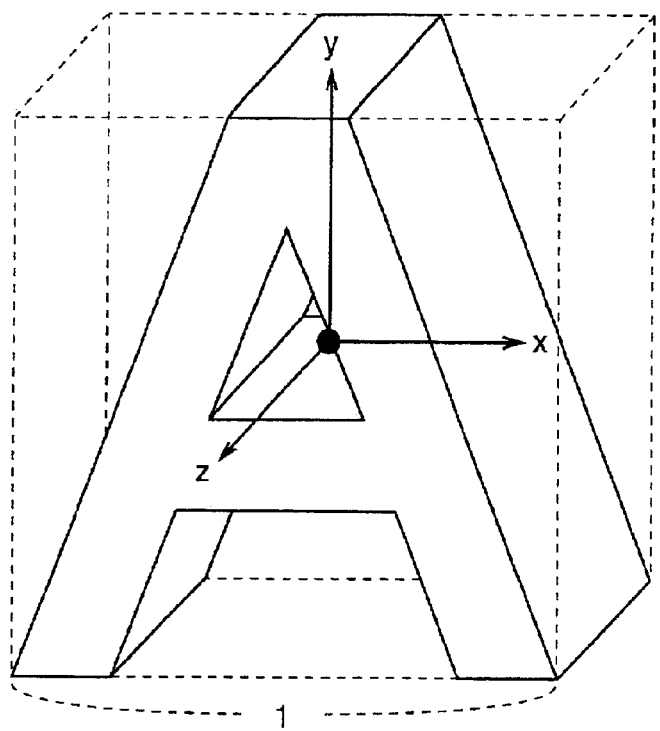
FIGS. 7(a) and 7(b) are diagrams for explaining the generation of scaled animation.
Figure 7B:
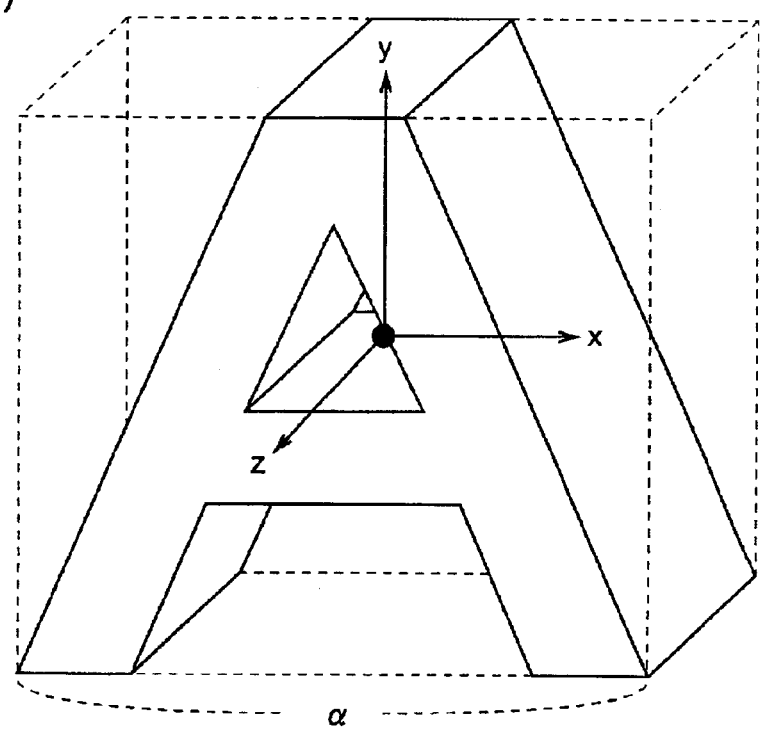

(1) When $0<=t<=TR$, (sx, sy, sz)=(1, 1, 1)
(2) When $TR<t<=TR+FRM$, (sx, sy, sz)=$((\alpha-1)/FRM \times t + (FRM-\alpha TR+TR)/FRM, 1, 1)$
(3) When $TR+FRM<x<=TFRM$, (sx, sy, sz)=$(\alpha, 1, 1)$ FIGS. 7(a) and 7(b) are diagrams showing results which are obtained by applying the above-mentioned example to 3D character "A". FIG. 7(a) shows 3D character "A" in a case where t=0. FIG. 7(b) shows 3D character "A" in a case where t=TRFM, which is magnified $\alpha$ times in the x-axis direction, with respect to the case shown in FIG. 7(a).

Next, the generation of a translated animation will be described.

In the case of a translating animation, a path over which the origin of the character coordinate system (local coordinate system) corresponding to each character passes is generated as data. As functions that are used for generating data of the translated animation, there are, for example, a linear function, a quadratic function, and the like. Here, as a reference in the calculation of the amount of translating, there are following two types of references:

Reference (1): The amount of movement for each frame is fixed regardless of the number of frames.

Reference (2): The total amount of movement is fixed regardless of the number of frames.

The particular reference to be adopted may be decided on the apparatus side or may be set by the user. As an example, descriptions will be given of animation in a case where it is assumed that the initial positions of 3D characters designated by the interface unit 101 is (x0, y0, z0) and the total number of frames is TFRM. It is also assumed in this example that the 3D characters are then moved in the positive direction on the x axis by the number of frames FRM starting from the frame time TR, using the linear function, and then the 3D characters are maintained in the standstill state in the position for the remaining frames. When reference (1) is adopted, assuming that the amount of movement for each frame is v=(mx, 0, 0), the frame time t and the corresponding 3D positions (x, y, z) of the character string at that time have the following relationship:

(1) When 0<=t<=TR, (x, y, z)=(x0, y0, z0)
(2) When TR<t<=TR+FRM, (x, y, z)=(x0+mx×(t−TR), y0, z0)
(3) When TR+FRM<t<=TFRM, (x, y, z)=(x0+mx×FRM, y0, z0)

On the other hand, when reference (2) is adopted, the animation data generation unit 105 should solve a boundary value problem by taking the initial position of the 3D characters at the start time of animation in a state and the end position of the 3D characters at the end time of the animation in a moving state as the boundary conditions so as to calculate the amount of movement for each unit time. Assuming that the total amount of movement is p=(px, 0, 0), the frame time t and the corresponding 3D positions (x, y, z) of the character string at that time have the following relationship:

(1) When 0<=t<=TR, (x, y, z)=(x0, y0, z0)
(2) When TR<t<=TR+FRM, (x, y, z)=(px/FRM×(t−TR)+x0, y0, z0)
(3) When TR+FRM<t<=TFRM, (x, y, z)=(x0+px, y0, z0)

Further, in the animation data generation apparatus according to this first embodiment, animation that is based on physical rules can be generated by using physical functions. Physical movements such as free fall, repetitive collision on the basis of restitution coefficients, simple harmonic motion, and the like can all be represented by simple formulas. Therefore, by using functions which utilize these formulas, i.e., physical functions as functions in the case of calculating the amount of movement, animation that is based on the physical rules can be generated. For example, when assuming that the initial position of a 3D character is (x, y, z)=(x0, y0, z0) and the total number of frames is TFRM, in a case of animation in which the 3D character falls freely for a period corresponding to the number of frames FRM starting from the frame time TR and then keeps in a standstill state for the remaining frames, the frame time t and the corresponding 3D position (x, y, z) of the character string at that time have the following relationship:

(1) When 0<=t<=TR, (x, y, z)=(x0, y0, z0)
(2) When TR<t<=TR+FRM, (x, y, z)=(x0, y0+½×g×(t−TR)^2, z0)
(3) When TR+FRM<t<=TFRM, (x, y, z)=(x0, y0+½×g×FRM^2, z0)

Here, g (<0) denotes the acceleration of gravity.

Next, the method for generating a rotated animation will be described.

In the case of a rotated animation, the rotational angle of each 3D character is generated as data. As references which are used when calculating the amount of rotation at the data generation, there are the following two types of references similar to the case of the generation of a translated animation:

Reference (1): fixing the rotation amount per frame, regardless of the number of frames Reference (2): fixing the total rotation amount, regardless of the number of frames.

The particular reference to be adopted can be defined on the side of the apparatus or may be set by the user. Here, a case where reference (2) is adopted is described. Similar to the case of the translated animation, the animation data generation unit 105 is required to solve a boundary value problem by taking the rotational angle at the start time of the animation in the moving state and the rotational angle at the end time of the animation in the moving state as boundary conditions, thereby calculating the rotation amount per unit time.

As an example, a case of an animation will be described where, assuming that the total number of frames is TFRM, a 0.3D character is rotated n turns (n is a positive integer) about the x axis with a constant angular velocity for a period corresponding to the number of frames FRM starting from the frame time TR, and then the 3D character is kept in the standstill state for the remaining frames. In this case, the frame time t and the corresponding rotation angle (rx, ry, rz) of the character at that time have the following relationship:

(1) When 0<=t<=TR, (rx, ry, rz)=(0, 0, 0)
(2) When TR<t<=TR+FRM, (rx, ry, rz)=(2πn/FRM×(t−TR), 0, 0)
(3) When TR+FRM<t<=TFRM, (rx, ry, rz)=(2π×n, 0, 0)

Here, the unit is a radian.

The animation data generation apparatus according to the first embodiment generates animation data of individual 3D characters by simultaneously combining the above-mentioned scaling, translating, and rotation so as to generate animations of a complicated 3D character string. When animation data of each 3D character is to be generated, the animation data may be generated by slightly changing the parameter of the function for each character.

Figure 9:
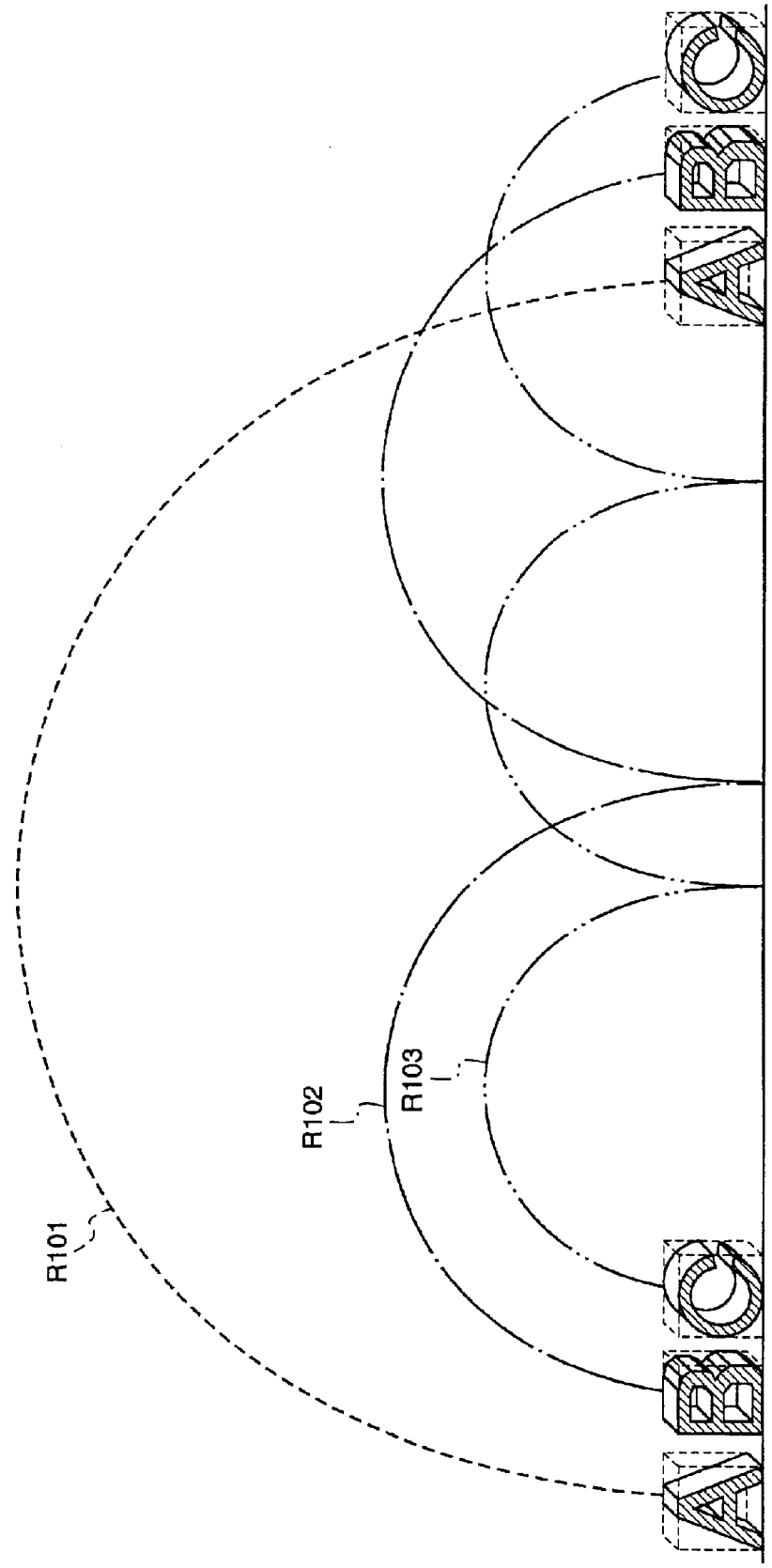
FIG. 9 is a diagram for explaining an example of animation according to the first embodiment.

With reference to FIG. 9, descriptions will be given of a specific example of a case where the parameter of the function is slightly changed for each of the plural 3D characters. FIG. 9 is a diagram illustrating an animation up to the 5th sec. according to the example of FIG. 3. Initially, the animation data generation unit 105 generates an animation corresponding to 30 frames, i.e., characters which are arranged horizontally in a row in the standstill state from the 0th sec. to the 1st sec., as "ABC" shown on the left side in FIG. 9. Next, "bound" animation in the moving state is generated. At this time, since these characters are arranged horizontally in a row also in the standstill state starting from the 5th sec., bounding that makes the respective characters move by the same distance is implemented. When the numbers of bound are set from the left character (i.e., "A") as "0", "1" and "2", the characters "A", "B" and "C" translated along routes R101, R102 and R103, respectively, as shown in FIG. 9. Then, from the 5th sec. to the 7th sec., the characters are arranged horizontally in a row, whereby a state where the characters are readable is supplied to the readers. As described above, even when the same type of function (for example, a function corresponding to "bound") is employed, a more complicated 3D character animation can be obtained by slightly changing the parameters of the function for each character.

Figure 8:
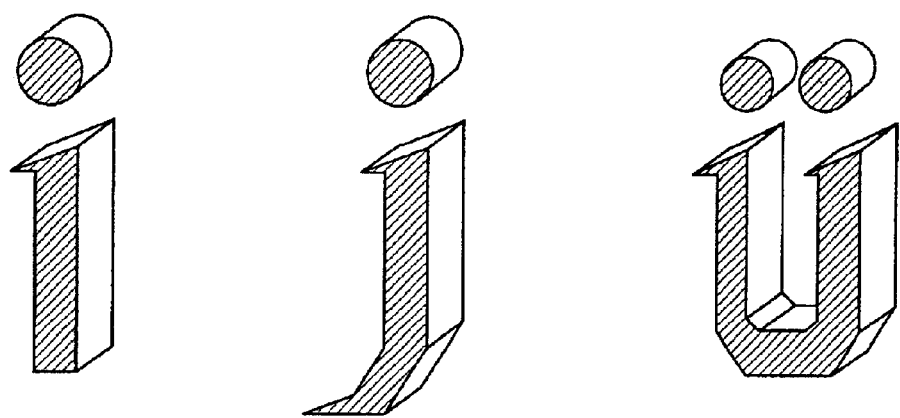
FIG. 8 is a diagram illustrating examples of 3D characters which can be divided into individual parts.

In some cases, the 3D character can be divided into individual parts, such as left or right portions of Chinese characters and umlauts, as shown in FIG. 8. In other cases, when 3D character animation is to be generated, it is not required to move each of the characters by animation, and instead, the characters can be moved in groups of plural characters. For example, in the case of a character string "ABCDEF", an animation may be generated by grouping the characters into "AB", "CD" and "EF". In this case, the 3D character generation unit 103 can generate 3D images for each of the individual parts of the character such as an umlaut and parts of the character other than the umlaut, or each of predetermined character groups, and then the 3D character generation unit 103 can generate animation data by using the generated images. Here, generating 3D images for each of the individual parts of the character or each group of characters means defining a shape boundary box and a local coordinate system which has the origin at the center of gravity of each shape boundary box for each of the individual parts or each group of characters, similar to the case of the 3D character generation.

The animation data which is generated by the animation data generation unit 105 is fundamentally time series data of scaling, translating and rotation, while required formats of the generated data depend on the apparatus which use the data. Therefore, the animation data generation unit 105 can include a means for converting the data format.

As described above, the animation data generation apparatus of the first embodiment is provided with the animation data generation unit 105 which generates animation data in the standstill state so that 3D characters are in a readable state, and generates animation data of the 3D characters in the moving state so as to link to the animation data in the standstill state by using the number of frames which are calculated by the number-of-frame calculation unit 102 and the function corresponding to the type of the animation which is set by the interface unit 101. Therefore, even when the 3D character animation data is generated on the basis of the function, a state where the 3D characters are readable is supplied in periods corresponding to the standstill states of the animation. In addition, since the interface unit 101 allocates time to the standstill state, the state where the 3D characters are readable can be set at a period which is designated by the user.

In this first embodiment, the interface unit 101 sets the characters which are used for animation. However, it is also possible to previously store 3D character strings which are used for animation in the storage unit 104 and to generate animation data by using the stored 3D characters. In this case, the setting of characters by the interface unit 101 is not required.

Further, in this first embodiment, only the arrangement of the characters in the standstill state is set by the standstill state templates. However, positions of the character string can also be set in the standstill state templates, and the animation data generation unit 105 can then generate animation data in the moving state by taking the positions of the character string as boundary conditions.

Second Embodiment

Figure 10:
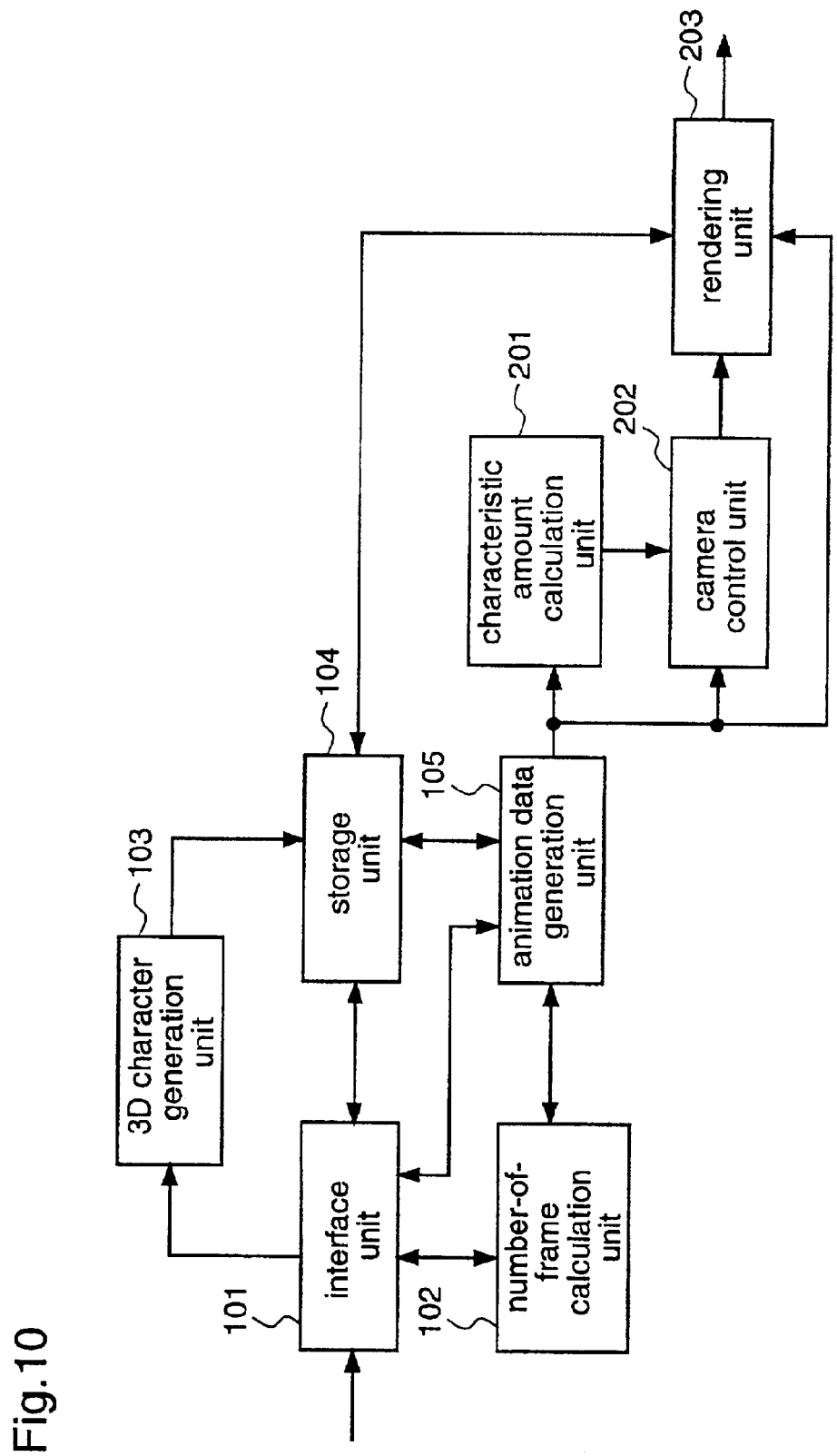
FIG. 10 is a block diagram illustrating a structure of an animated video generation apparatus according to a second embodiment of the present invention.

FIG. 10 is a block diagram illustrating the structure of an animated video generation apparatus according to a second embodiment of the present invention.

In FIG. 10, the animated video generation apparatus according to the second embodiment includes an interface unit 101, a number-of-frame calculation unit 102, a 3D character generation unit 103, a storage unit 104, an animation data generation unit 105, a characteristic amount calculation unit 201, a camera control unit 202, and a rendering unit 203. The respective structures and operations of the interface unit 101, the number-of-frame calculation unit 102, the 3D character generation unit 103, the storage unit 104, and the animation data generation unit 105 are the same as those as described above in the first embodiment.

The characteristic amount calculation unit 201 calculates the amount of characteristics, which is an amount that is characteristic of the 3D character animation. The maximum and minimum values of a spatial movement amount in the global coordinate system of each 3D character (hereinafter, referred to as an animation boundary box), the position or posture of each character, and the like are examples of the characteristic amount. These characteristic amounts are required when the camera position is to be controlled in the case of generating video, or when video is to be composed with other objects.

The camera control unit 202 controls the position and posture of the camera with respect to animation data, on the basis of the characteristic amount which is calculated by the characteristic amount calculation unit 201, so that 3D characters in the animation in the standstill state can be read.

The rendering unit 203 generates animated video of 3D characters by using the camera position and posture which are calculated by the camera control unit 202 and the animation data which is obtained from the animation data generation unit 105.

Next, the operation of the animated video generation apparatus according to the second embodiment will be described.

Figure 11:
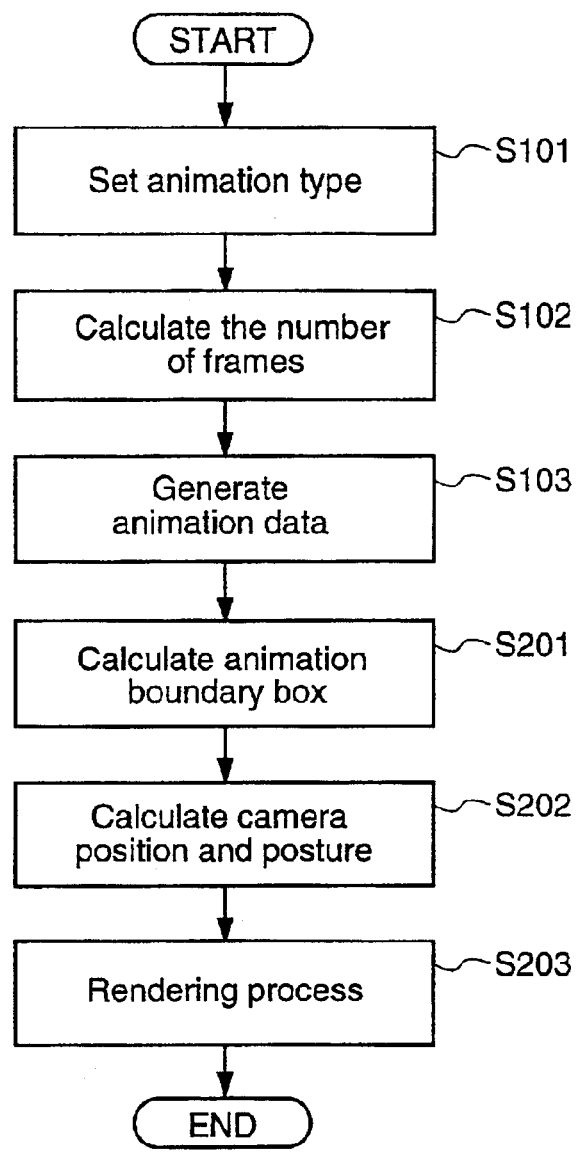
FIG. 11 is a flowchart for explaining an operation of the animated video generation apparatus according to the second embodiment.

FIG. 11 is a flowchart for explaining the operation of the animated video generation apparatus according to the second embodiment. Here, the processings of steps S101 to S103 are the same as those as described above in the first embodiment.

The characteristic amount calculation unit 201 receives the animation data which are generated by the animation data generation unit 105, and calculates an animation boundary box as a characteristic amount and the posture of each character in the standstill state on the basis of the received data (step S201).

Initially, the calculation of the animation boundary box is described.

The characteristic amount calculation unit 201 calculates the maximum and minimum values in the global coordinate system corresponding to the center of gravity of each 3D character as values of an animation boundary box. In the scaling and rotation animation from among the above-mentioned three types of fundamental animation, the maximum and minimum values are both barycentric coordinates of the shape boundary box. Thus, hereinafter, descriptions will be given of a method for calculating an animation boundary box when generating animation data that is associated with translating. It is assumed here that the initial position coordinates of a 3D character are $(x, y, z)=(x0, y0, z0)$, the animation maximum boundary box is $(xmax, ymax, zmax)$, the animation minimum boundary box is $(xmin, ymin, zmin)$, and the total number of frames is TFRM.

(1) Assuming that the frame time is t, it is decided that $xmax=xmin=x0$, $ymax=ymin=y0$, and $zmax=zmin=z0$ when $t=0$.

(2) When $t=i$, $xi$ is compared with xmax, and when $xi>xmax$, it is decided that $xmax=xi$. In other cases, $xi$ is compared with xmin, and when $xi<xmin$, it is decided that $xmin=xi$. This processing is performed from $t=1$ up to $t=TRM-1$. Also, as for $yi$ and $zi$, the same processing is performed.

The coordinates $(xmax, ymax, zmax)$ and $(xmin, ymin, zmin)$ which are finally obtained by the above-mentioned processes specify the animation boundary box. A rectangular parallelepiped having points indicated by these coordinates as opposed two vertexes (not in the same plane), i.e., a rectangular parallelepiped which is formed by planes that pass through these points indicated by these coordinates and are perpendicular to the X axis, Y axis and Z axis of the global coordinate system, respectively, is an animation boundary box.

Here, the characteristic amount calculation unit 201 may calculate this animation boundary box for the entire animation data, or for each animation in the moving state. In the latter case, the position of the camera can be controlled more flexibly.

In the case of animation like "explosion" in which images diverge, the animation boundary box may adversely become very large and thus is not appropriate. Therefore, in this case, the upper limit of the size of the animation boundary box is set and, when the size becomes larger than the upper limit, the upper limit of the animation boundary box may be used as the calculated animation boundary box.

Next, the calculation of the position and posture of each character in the standstill state will be described.

The characteristic amount calculation unit 201 calculates the position and posture of each character in the standstill state. These data are required for controlling the camera when video is to be generated (which will be described later). In this second embodiment, a posture vector of a character is defined by representing a z-axis direction unit vector in the character coordinate system or a partial coordinate system (local coordinate system) by the global coordinate system. The calculation of the position and posture of the character in the standstill state is performed in accordance with the following procedure. Here, a matrix for a transformation from the local coordinate system into the global coordinate system is assumed to be R. In principle, the transformation matrixes vary with respective characters, i.e., local coordinate systems.

(1) In a section corresponding to a frame in a standstill state among animation data, the position of each 3D character, i.e., the position (xb, yb, zb) of the origin in each local coordinate system, is calculated.

(2) In addition, when assuming that the z-axis positive direction unit vector (vz) in the character coordinate system is vz=(0, 0,1)T, the posture vector vb=(xvb, yvb, zvb)T of the character is obtained by calculating vb=R*vz. Here, T represents transposition, and * represents a product of a matrix and a vector, or a product of a vector and a vector.

The camera control unit 202 calculates the path over which the camera moves and the camera posture for generating animated video of 3D characters (step S202). In the case of 3D character animation, it is very important that the character string can be read by the readers in a section corresponding to animation in the standstill state. Therefore, the camera control is mainly performed by taking the camera position in the section corresponding to animation in the standstill state as a reference (key frame).

Initially, a description is given of a mode in which the position of the camera is fixed in all of the animation sections (hereinafter, referred to as a stationary mode). The animation data generation unit 105 and the characteristic amount calculation unit 201 calculate the coordinates and posture vector of each character at the animation end time. In the stationary mode, these data are used to decide the camera position and posture. Also, in the stationary mode, templates are prepared so as to decide the position of a 3D character string at the animation end time, i.e., in which a part of an image among the upper part, the center part, and the lower part of the 3D character string is to be displayed, and to further decide whether an image of the character string that is seen from the front is displayed or whether an image of the character that is seen slightly obliquely to an extent in which the character string can be read is displayed, and the like. The decision of the camera position and posture in the stationary mode is performed in accordance with the following procedure:

(1) From the position vector $pi=(x_i, y_i, z_i)$ (i=0, . . . , N−1) of each character, the mean position vector of the character string meanp=$((x_0+x_1+ \ldots +x_{N-1})/N, (y_0+y_1+ \ldots +y_{N-1})/N, (z_0+Z_1+ \ldots +z_{N-1})/N)$ is calculated.

Here, N is the number of characters, and the character position (xb, yb, zb) of each 3D character which is calculated by the characteristic amount calculation unit 201 is used as the position vector $p_i$ of each character.

(2) From the posture vector $vi=(xv_i, yv_i, zv_i)$ (i=0, . . . , N−1) of each character, the mean posture vector meanv of the character string is calculated in accordance with the same procedure as described above in procedure (1). As the posture vector vi of each character, the posture vector vb of each 3D which is character calculated by the characteristic amount calculation unit 201: vb=(xvb, yvb, zvb) is employed.

Figure 12:
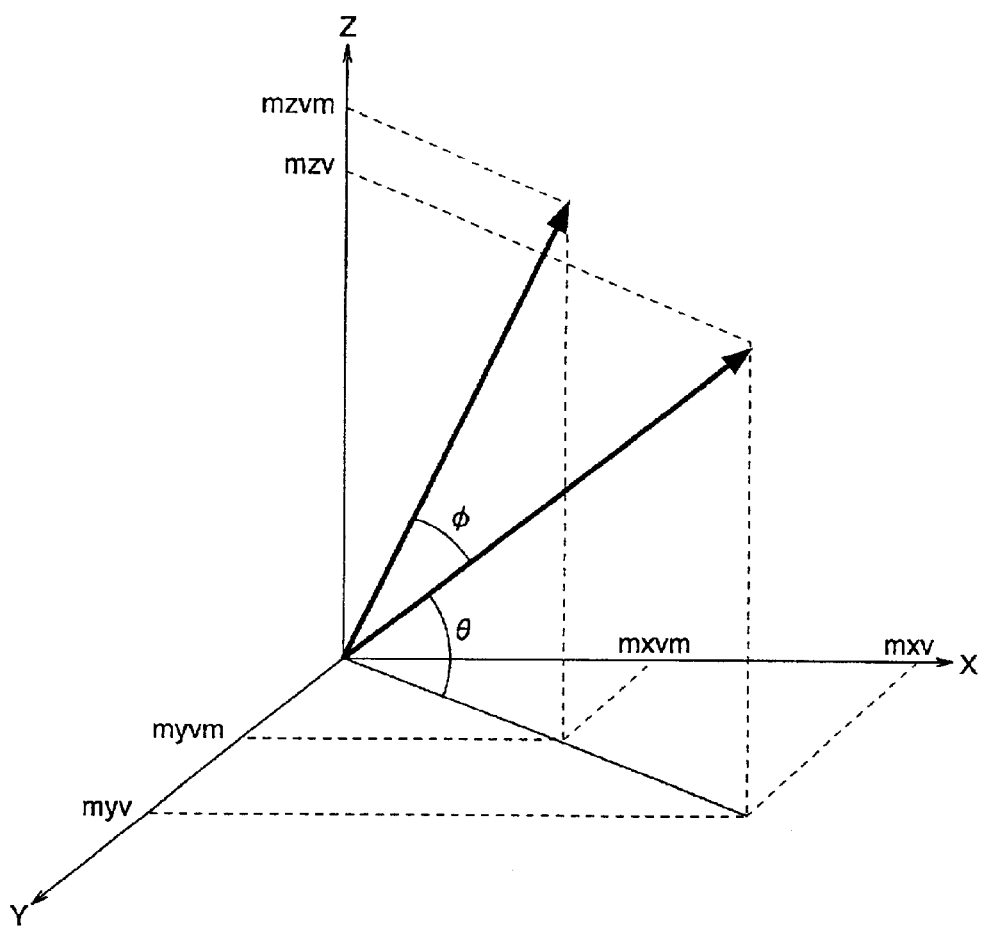
FIG. 12 is a diagram for explaining a camera position modification method in a case where video of character strings which are viewed obliquely from above is generated according to the second embodiment.

(3) Then, the posture of the camera is decided. When video of the character string that is seen from the front is to be generated, the viewing direction of the camera is obtained by multiplying meanv by −1. When video of the character string that is obliquely seen is generated, the viewing direction is a vector which is obtained by modifying meanv. For example, FIG. 12 shows a modification method in a case where video of a character string that is obliquely seen from the top is to be generated. Assuming that meanv=(mxv, myv, mzv), an angle θ which the X-Y plane makes with meanv is represented by arctan (mzv/L). Here, L is the length of a vector that is obtained by projecting meanv on the X-Y plane. When video of the character string that is obliquely seen from the top is to be generated, it is required to calculate a vector meanvm=(mxvm, myvm, mzvm) corresponding to meanv further rotated through a micro-angle φ. Here, meanvm can be calculated according to the following formula:

$mxvm=\cos(\theta+\phi)*\cos(arctan(myv/mxv))$ $myvm=\cos(\theta+\phi)*\sin(arctan(myv/mxv))$ $mzvm=\sin(\theta+\phi)$ Here, * represents a product. The viewing direction vector is obtained by multiplying this by −1.

(4) Next, the camera position is determined. Assuming that a viewing transformation matrix is MCAM, a perspective transformation matrix is MPER, the world coordinate system is w=(x, y, z, 1)T, and a projection plane coordinate system is cp (xp, yp, zp, 1)T, the relationship between the world coordinate system and the projection plane coordinate system is represented by a formula of cp=MPER*MCAM*w.

When calculating the camera position by using the above formula, an approximate camera position is determined by using meanp and meanv or meanvm, and then, the camera position is adjusted by using coordinates of each character in the section corresponding to the animation in the standstill state, the shape boundary box data, and the animation boundary box data. This adjustment may be carried out by any method, but it is important to adjust the distance from the character string so that the entire character string fits into an image.

Next, a description will be given of a method for deciding the camera position and posture in a case where the standstill states exist in plural sections of animation. Also, when there are plural standstill states, the stationary mode can be employed for any of the standstill states. Hereinafter, not the stationary mode but a mode in which the camera is moved during animation (hereinafter, referred to a moving mode) will be described. In the moving mode, the position and posture of the camera in a section corresponding to each animation in the standstill state are initially calculated in the same manner as in the stationary mode. The user can decide an approximate position and posture of the camera by the template selection for each section of animation in the standstill state, similar to the case of the stationary mode as described above. In the moving mode, a path over which the camera moves between the decided camera positions and postures in the sections of the standstill state animation is decided. As the moving path decision method, three kinds of methods will be described.

(Interpolation Using Functions)

The path over which the camera position and posture move in the animation section is decided on the basis of interpolation utilizing functions. As the functions to be utilized, there are a linear function, a spline function, a B-spline function, and the like.

As an example, descriptions will be given of a case where, assuming that the camera positions in sections corresponding to the adjacent standstill animation are $(x_i, y_i, z_i)T$ and $(x_{i+1}, Y_{i+1}, z_{i+1})T$, a path over which the camera position moves between the two sections is decided by using the linear interpolation. Assuming that the number of frames corresponding to a moving section is TFRM, the camera position t frames after the start of motion is represented by $(x_i, y_i, z_i)T+t/TFRM \times (x_{i+1}-x_i, y_{i+1}-y_i, z_{i+1}-z_i)T$. The camera posture is also controlled by using the same method.

(Decision of the Moving Path by Utilizing a Motion Template)

The decision of moving path by utilizing motion templates is one kind of interpolations using functions, while this method can set a more complicated path. Similar to the case of animation templates, the motion templates correspond to functions or groups of functions for specifying the moving path of the camera, in a one-to-one relationship, and then the user selects one of these motion templates. For the selected template, parameters of the function are decided by using the same method as in the case where animation data is generated from the camera positions and postures of the adjacent standstill sections, thereby calculating the camera position and posture for each frame. As an example, descriptions will be given of camera movement in which interpolation using the linear function is performed with respect to the x and y coordinates and, with respect to the z axis, the camera gets to a section of the next standstill animation state while moving far from the character string for first (TFRM/2) frames (assuming that z coordinate of the farthest point is k) and then coming closer again to the character string for the remaining (TFRM/2) frames. The number of frames t after the start of the motion and the corresponding camera position (xc, yc, zc) at that time have the following relationship. Here, it is assumed that the camera positions of the adjacent standstill sections are $(x_i, y_i, z_i)$ and $(x_{i+1}, y_{i+1}, z_{i+1})$, and the number of frames corresponding to the moving section is TFRM.

(1) When $0<=t<=TFRM/2$, $(xc, yc, zc,)=(x_i+t/TFRM \times (x_{i+1}-x_i), y_i+t/TFRM \times (y_{i+1}-y_i), z_i+2 \times (k-z_i)/TFRM \times t)$ (2) When $TFRM/2<t<=TFRM$, $(xc, yc, zc)=(x_i+t/TFRM \times (x_{i+1}-x_i), y_i+t/TFRM \times (y_{i+1}-y_i), 2k-z_{i+1}+2 \times (z_{i+1}-k)/TFRM \times t)$ (Decision of the Moving Path by Using an Optimization Theory)

According to a method using the optimization theory, such a path of the camera that maximizes an objective function f(P(t)) is automatically decided. P(t) is a function for controlling the position and posture of the camera. An example of the objective function f is, for example, the number of characters which are displayed during video. The decision of the camera moving path P(t) that maximize the objective function f resolves itself into an optimization problem.

As an example, descriptions are given of the moving path calculation method in a case where it is assumed that the total number of characters which are displayed within an image is f, and it is assumed that P(t) is represented by a cubic spline function. Here, it is assumed that the camera positions in sections of the adjacent standstill animations are (xs, ys, zs)T and (xe, ye, ze)T, and the camera postures are $(\alpha s, \beta s, \gamma s)T$ and $(\alpha e, \beta e, \gamma e)T$. According to the cubic spline function, once the value of the node is decided, the configuration of the function is uniquely decided. Therefore, the x component of the camera moving path can be represented by $x(cx_i)$. Here, $cx_i$ represents the coordinates of the i-th node that is set in the animation section where $i=0, \ldots, N-1$. N represents the number of nodes. Also y, z, $\alpha$, $\beta$ and $\gamma$ components can be represented in the same manner, and the respective components of the camera moving path and posture are $y(cy_i)$, $z(cz_i)$, $\alpha(c\alpha_i)$, $\beta(c\beta_i)$ and $\gamma(c\gamma_i)$. Accordingly, the moving path of the camera can be represented by $P(cx_i, cy_i, cz_i, c\alpha_i, c\beta_i, c\gamma_i)$.

(1) The initial moving path $P0(cx_i, cy_i, cz_i, c\alpha_i, c\beta_i, c\gamma_i)$ of the camera is generated.

(2) The total number of characters which are displayed when the camera is controlled in accordance with the path that is decided in (1), i.e., the value of the objective function f, is calculated by using the perspective transformation matrix. Here, the total number of characters is calculated on the basis of the number of respective origins of the local coordinate systems corresponding to characters existing within a screen.

Then, the following processes are repeated until the objective function f comes to have the maximum value.

(3) The coordinates $(cx_i, cy_i, cz_i, c\alpha_i, c\beta_i, c\gamma_i)$ of the node are updated in the direction along which the value of the objective function f becomes larger, thereby generating $Pk(cx_i, cy_i, cz_i, c\alpha_i, c\beta_i, c\gamma_i)$. Here, it is assumed that $cx_0=xs$, $cy_0=ys$, $cz_0=ZS$, $c\alpha_0=\alpha s$, $c\beta_0=\beta s$, $c\gamma_0=\gamma s$, $cx_{N-1}=xe$, $cy_{N-1}=ye$, $cz_{N-1}=ze$, $c\alpha_{N-1}=\alpha e$, $c\beta_{N-1}=\beta e$, and $c\gamma_{N-1}=\gamma e$, and these values are not changed.

(4) The value of the objective function f is calculated by using the perspective transformation matrix.

In order to realize the above-mentioned method, an algorithm such as steepest decent method, quasi-Newton method, genetic algorithm, and neutral network is employed. The finally obtained $Pn(cx_i, cy_i, cz_i, c\alpha_i, c\beta_i, c\gamma_i)$ is the path of the camera position/posture. When this method is employed, the maximum number of characters can be displayed in an image during the camera movement.

The rendering unit 203 carries out a rendering process by using 3D character data which is generated independently of animation data and which is stored in the storage unit 104, the animation data which is generated by the animation data generation unit 105, and the camera moving path which is obtained by the camera control unit 202 so as to generate animated video, and to output the animated video as video data (step S203). This video data is finally displayed using a display unit (not shown) or the like.

As described above, the animated video generation apparatus according to the second embodiment includes the characteristic amount calculation unit 201 for calculating the characteristic amount as an amount which is characteristic of 3D character animation, the camera control unit 202 for calculating the position and posture of the camera with respect to the animation data on the basis of the characteristic amount, and the rendering unit 203 for generating 3D character animated video by using the camera position and posture which are obtained by the camera control unit 202 and the animation data. Therefore, animated video of 3D characters in the standstill state can be generated so that the 3D characters can be read.

Third Embodiment

Figure 13:
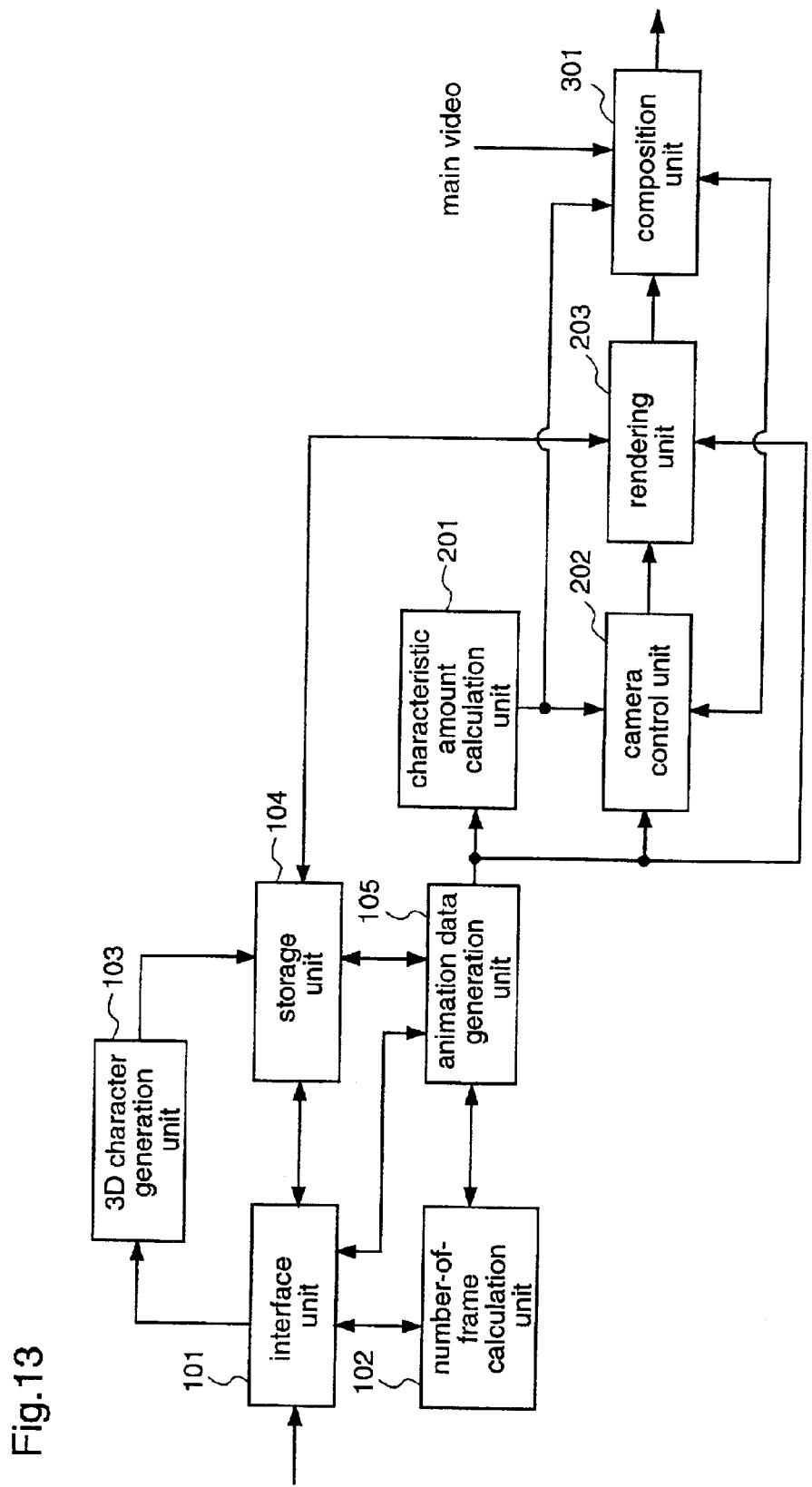
FIG. 13 is a block diagram illustrating a structure of an animated video generation apparatus according to a third embodiment of the present invention.

FIG. 13 is a block diagram illustrating the structure of an animated video generation apparatus according to a third embodiment of the present invention.

In FIG. 13, the animated video generation apparatus according to the third embodiment includes an interface unit 101, a number-of-frame calculation unit 102, a 3D character generation unit 103, a storage unit 104, an animation data generation unit 105, a characteristic amount calculation unit 201, a camera control unit 202, a rendering unit 203, and a composition unit 301. Here, the structures and operations of the components other than the composition unit 301 are the same as those as described above in the second embodiment.

The composition unit 301 superimposes 3D character animated video that has been generated by the rendering unit 203 on a predetermined area in the main video.

Next, the operation of the animated video generation apparatus according to the third embodiment will be described.

Figure 14:
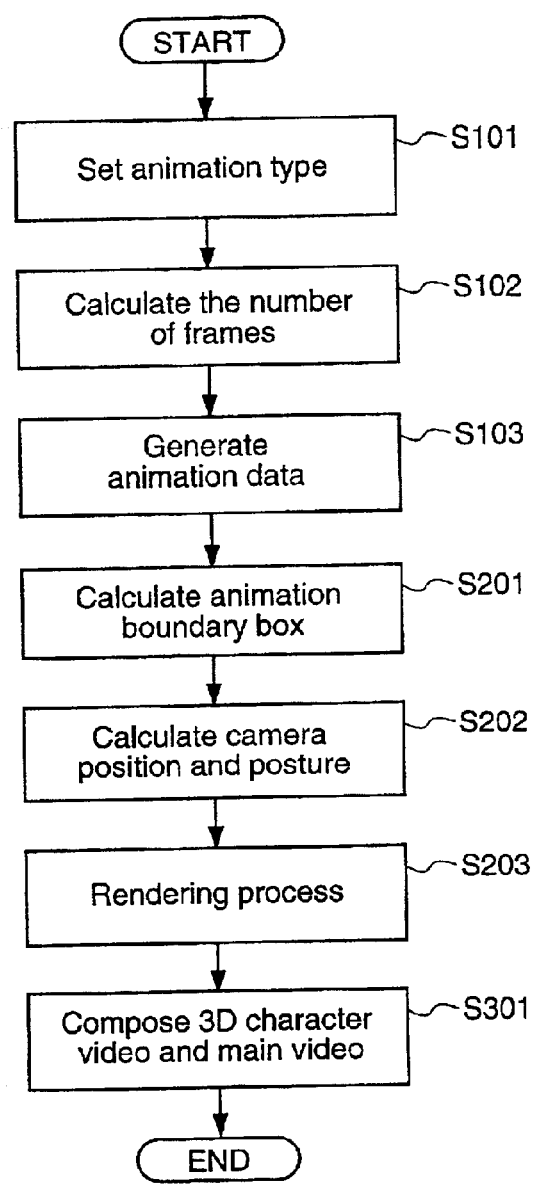
FIG. 14 is a flowchart for explaining an operation of the animated video generation apparatus according to the third embodiment.
Figure 15:
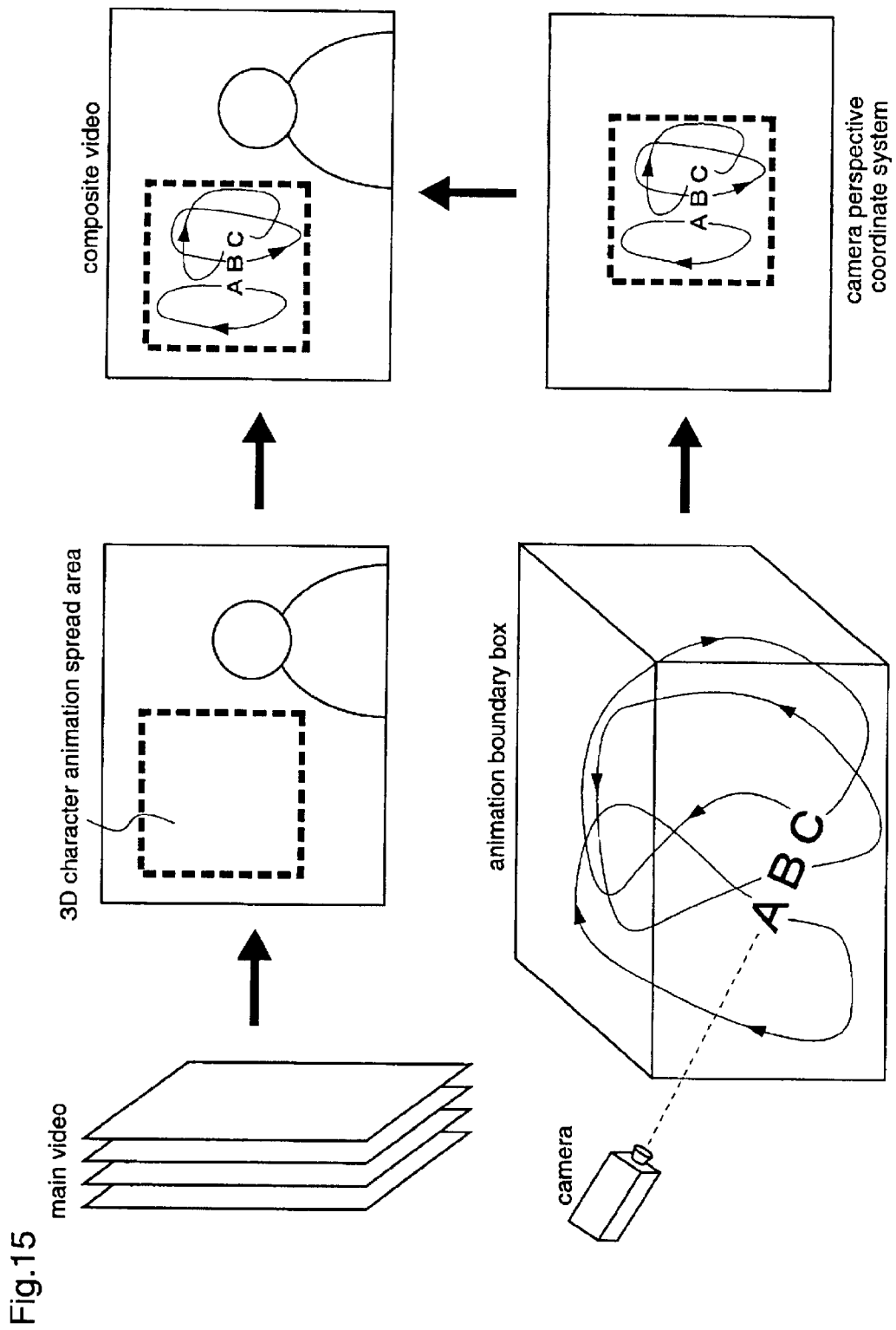
FIG. 15 is a diagram for explaining processes for composing animated video of 3D characters with the main video.

FIG. 14 is a flowchart for explaining the operation of the animated video generation apparatus according to the third embodiment. Here, the processes other than step S301 are the same as those as described above in the second embodiment. FIG. 15 is a diagram for explaining a process for superimposing 3D character animated video on the main video.

The composition unit 301 superimposes 3D character animated video on the main video so as not to interfere with the main video (step S301). Initially, the values of the animation boundary box which is calculated for each of the 3D characters constituting a character string are referred to, thereby calculating values of an animation boundary box for the entire character string. Next, with reference to the main video, a position in which the screen animation of the 3D character string is to be spread over is decided. As the method for deciding the position of the animation to be spread over, the following three kinds of methods are described:

(1) Method in Which the Position of the Main Video to be Spread Over is Restricted The position in which the main video is to be spread over is previously restricted on the screen, and then 3D character animation is spread over an area other than the restricted position. For example, when assuming that the screen size is (WIDTH, HEIGHT), the main video is restricted so as to be spread over a rectangular area that has (0, 0) and (WIDTH, 2*HEIGHT/3) as opposed vertexes (these vertexes are not adjacent to each other), and the position of the 3D character animation is decided so as to be spread over a rectangular area that has (0, 2*HEIGHT/3) and (WIDTH, HEIGHT) as opposed vertexes. By doing so, the 3D character animation can be prevented from overlapping with the main video.

(2) Method by Which the Position is Set by Users

The position in which the 3D character animation is to be spread over is set by the users while referring to the main video. For example, a pointing device such as a mouse (not shown) is prepared, and then the user sets a rectangular area on the screen, thereby deciding an area in which the 3D character animation is to be spread.

(3) Method by a Main Video Processing

The video processing technique is applied to the main video so as to semi-automatically decide an area in which the 3D character animation is to be spread. For example, as for an image of the first frame in the main video, the user sets an area corresponding to the core of the image, i.e., an area which includes persons that are connected with the video (characters) or the like and which is desirable not to be obstructed by 3D character animation such as a title, by using the pointing device such as a mouse. Then, histograms of information concerning the set area, i.e., the position, size, and brightness of the area, are calculated. Since the histograms of the area position or size, the moving direction in the area position (motion vector), and the brightness have a correlation between frames, areas which are desirable not to be obstructed are tracked for video corresponding to the second and subsequent frames by using these information. The above-mentioned processes are carried out for all of the frames in which the 3D character animation is spread so as to obtain the maximum and minimum values in the horizontal and vertical directions corresponding to the area in the main video that is desirable not to be obstructed. Finally, the area of the 3D character animation to be spread is decided within an area other than the area which is bordered by the maximum and minimum values in the horizontal and vertical directions. For example, the area can be decided so as to obtain a rectangular area having the maximum size, or the area can be decided so as to obtain a rectangular area having the maximum width.

Next, a method for composing animated video and the main video so that the 3D character animation is spread on the screen in the area which has been decided by any of the above-mentioned methods (1) to (3) will be described. Here, it is assumed that the area in which the 3D character animation is to be spread is decided to be a rectangular area having its opposed vertexes as (w0, h0) and (w1, h1) in the coordinate system which is set for the main video.

(1) Initially, the camera is set in a position which passes through meanp, has the direction vector of meanv or meanvm, and has an appropriate distance d from the character string in the standstill state. Thereby, meanp coincidences with the center of the projection plane coordinate system of the camera: (WIDTH/2, HEIGHT/2). These meanp and meanvm can be calculated by the composition unit 301 on its own; however, values that are calculated by the camera control unit 202 may instead be used.

(2) As for eight vertexes constituting the animation boundary box of entire whole character string, the coordinates in the projection plane coordinate system of the camera are calculated by using the perspective projection matrix, thereby obtaining vertexes having the maximum and minimum values in the horizontal and vertical directions.

(3) The camera control unit 202 is controlled so as to increase the distance from the camera to the 3D character when the maximum and minimum values obtained in process (2) are not included in the area where the 3D character animation is to be spread, i.e., a rectangular area having (WIDTH/2−(w1−w0)/2, HEIGHT/2−(h1−h0)/2) and (WIDTH/2+(w1−w0)/2, HEIGHT/2+(h1−h0)/2) as opposed vertexes, and to reduce the distance when the maximum and minimum values are fully included in the area.

(4) The process (3) is repeated until all the vertex values that are obtained in process (2) come to be included in the animation spread area and the spread area comes to have the maximum size.

By the above-mentioned processes, the 3D character animation that is to be superimposed on the main video is generated. The rendering process is carried out for the generated animation, thereby generating a 2D video with a (transparency signal). Here, for an area of the background other than the 3D character, it is set that α=0 (completely transparent). Then, the generated 3D character animated video is superimposed on the main video. A rectangular image is composed so that the coordinates of the 3D character animated video: (WIDTH/2−(w1−w0)/2, HEIGHT/2−(h1−h0)/2) and (WIDTH/2+(w1−w0)/2, HEIGHT/2+(h1−h0)/2) respectively coincide with (w0, h0) and (w1, h1) in the coordinate system of the main video. Here, since the 3D character animated video is transparent in areas other than the 3D character area, the main video is displayed in these areas.

As described above, 3D character animated video can be generated so as to not interfere with the main video. In the above descriptions, the composition unit 301 controls the camera control unit 202 so that the 3D character animated video fits into a rectangular area having (w0, h0) and (w1, h1) as the opposed vertexes. However, it may be possible that the composition unit 301 does not perform this control but instead superimposes the 3D character animated video on the main video by scaling the animated video that is outputted from the rendering unit 203.

The animated video generation apparatus according to the third embodiment is provided with the composition unit 301 for superimposing 3D character animated video on the main video so as not to interfere with the main video. Therefore, the 3D character animated video can be prevented from overlapping important parts of the main video, and the 3D character animated video can be properly superimposed on the main video.

Fourth Embodiment

Figure 16:
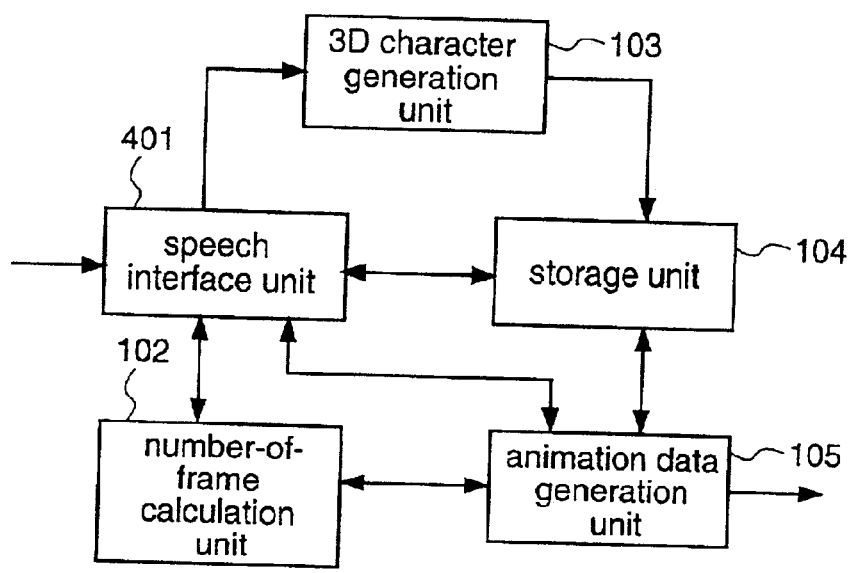
FIG. 16 is a block diagram illustrating a structure of an animation data generation apparatus according to a fourth embodiment of the present invention.

FIG. 16 is a block diagram illustrating the structure of an animation data generation apparatus according to a fourth embodiment. Here, the structures and operations of components other than a speech interface unit 401 are the same as those as described above in the first embodiment.

The speech interface unit 401 receives speech inputs and sets animation templates and the like on the basis of the inputted speech. More specifically, the speech interface unit 401 has animation templates corresponding to phrases, onomatopoeic words and mimetic words, and employs speech recognition technology which is implemented by software or hardware so as to make the inputted speech match with the animation templates. Further, the speech interface unit 401 decides an animation template corresponding to the inputted speech. For example in a case where "bound" in the animation templates corresponds to speech such as "bound", "pyon—pyon", and "boyon— boyon", when speech like "bound" or "pyon—pyon" is inputted, "bound" is set as the type of animation. Similarly, factors other than the animation templates such as standstill state templates for example, can be set by the speech input. The functions of the speech interface unit 401 other than the setting of animation templates and the like by the speech inputs are the same as those of the interface unit 101 as described above in the first embodiment.

It is possible to limit the setting of the animation type by the speech inputs such that the animation type is set only when an accurate speech like "pyon—pyon" is inputted, while it is also possible to allow some latitude and set the animation type at "bound", for example even when speech like "poyon—poyon" is inputted. That is, for some speech input, an animation type that is considered to be the closest to the inputted speech can be selected. Thus, when the user freely inputs speech such as an onomatopoeic word and a mimetic word that the user has hit upon at the setting of the animation type, the user can enjoy the type of animation which would be set. Particularly, in the case where the animation data generation apparatus is used as a titler, there are many cases where the users do not stick to specific types of animation in the moving state. In such cases, when the animation type is set in accordance with the speech inputs, interfaces which excite users' interests can be supplied.

Here, the animation data generation apparatus and the animated video generation apparatus according to any of the aforementioned embodiments can be constituted by hardware, or software under control of a program. When these apparatus are constituted by software, a storage medium that contains a program for implementing the animation data generation method or animated video generation method is supplied to a system or apparatus. Then, a main processor of the system or apparatus, such as a CPU, reads and executes the program stored in the storage medium, whereby the same effects as those described in the aforementioned embodiments are obtained.

What is claimed is:

1. An animation data generation apparatus comprising:
    an interface unit operable to set a time allocation between 3D character animations in a moving state and in a standstill state, and to set a type of the animation in the moving state;
    a number-of-frames calculation unit operable to calculate the number of frames corresponding to an animation based on the time allocation between the animations in the moving state and the standstill state which is set by said interface unit; and
    an animation data generation unit operable to generate data of the animation in the standstill state at a predetermined position at a predetermined time so that the 3D characters can be read, and to generate data of the 3D character animation in the moving state so as to reach and to link to the animation data in the standstill state, which is displayed at a predetermined position at a predetermined time, by using the number of frames calculated by said number-of-frames calculation unit and a function corresponding to the type of the animation in the moving state set by said interface unit,
    wherein said animation data generation unit is operable to generate the animation in the moving state before generating another animation in the standstill state.

2. The animation data generation apparatus of claim 1, wherein
    said interface unit is further operable to set characters which are used in animation, and
    said animation data generation unit is further operable to generate the animation data by using the 3D character data corresponding to the characters which are set by said interface unit.

3. The animation data generation apparatus of claim 2, further comprising a 3D character generation unit operable to generate 3D character data corresponding to the characters which are set by said interface unit, and
    wherein said animation data generation unit is operable to generate the animation data by using the 3D character data generated by said 3D character generation unit.

4. The animation data generation apparatus of claim 2, further comprising a storage unit having a table that includes the characters which are set by said interface unit and the 3D character data of the set characters in correspondence with each other, respectively, and
    wherein said animation data generation unit is operable to generate the animation data by using the 3D character data stored in said storage unit.

5. The animation data generation apparatus of claim 1, wherein said interface unit is operable to set the type of the animation in the moving state by using templates.

6. The animation data generation apparatus of claim 1, wherein said interface unit is further operable to set an arrangement of 3D characters in the standstill state, and said animation data generation unit is operable to generate the animation data in the standstill state based on the arrangement of the 3D characters in the standstill state which is set by said interface unit.

7. The animation data generation apparatus of claim 6, wherein said interface unit is operable to set the arrangement of 3D characters in the standstill state by using templates.

8. The animation data generation apparatus of claim 1, wherein said animation data generation unit is operable to generate the animation data by using a physical function as a function corresponding to the type of animation in the moving state which is set by said interface unit.

9. The animation data generation apparatus of claim 1, wherein said animation data generation unit is operable to generate the animation data by using a function corresponding to at least one process from among scaling, translating, and rotation.

10. The animation data generation apparatus of claim 1, wherein said animation data generation unit is operable to generate the animation data for each character.

11. The animation data generation apparatus of claim 1, wherein said animation data generation unit is operable to generate the animation data for each individual part of each character or for each group of characters.

12. The animation data generation apparatus of claim 1, wherein said interface unit is operable to receive speech input, and to set the type of the animation in moving state based on the received speech input.

13. An animation data generation method comprising:

setting a time allocation between 3D character animations in a moving state and in a standstill state, and setting a type of the animation in the moving state;

calculating the number of frames corresponding to an animation based on the set time allocation between the animations in the moving state and the standstill state; and generating data of the animation in the standstill state at a predetermined position at a predetermined time so that the 3D characters can be read, and generating data of the 3D character animation in the moving state so as to reach and to link to the data of the animation in the standstill state, which is displayed at a predetermined position at a predetermined time, by using the number of frames calculated in said calculating of the number of frames and a function corresponding to the type of the animation in the moving state set in said setting of the type of the animation, wherein said generating of the data generates the animation in the moving state before generating another animation in the standstill state.

14. A computer-readable program storage medium that contains a program for making a computer execute:

setting a time allocation between 3D character animations in a moving state and in a standstill state, and setting a type of the animation in the moving state;

calculating the number of frames corresponding to an animation based on the set time allocation between the animations in the moving state and the standstill state; and generating data of the animation in the standstill state at a predetermined position at a predetermined time so that the 3D characters can be read, and generating data of the 3D character animation in the moving state so as to reach and to link to the data of the animation in the standstill state, which is displayed at a predetermined position at a predetermined time, by using the number of frames calculated in said calculating of the number of frames and a function corresponding to the type of the animation in the moving state set in said setting of the type of the animation, wherein said generating of the data generates the animation in the moving state before generating another animation in the standstill state.

15. An animated video generation apparatus comprising:

an interface unit operable to set a time allocation between 3D character animations in a moving state and in a standstill state, and to set a type of the animation in the moving state;

a number-of-frames calculation unit operable to calculate the number of frames corresponding to an animation based on the time allocation between the animations in the moving state and the standstill state which is set by said interface unit; and an animation data generation unit operable to generate data of the animation in the standstill state at a predetermined position at a predetermined time so that the 3D characters can be read, to generate data of the 3D character animation in the moving state so as to reach and to link to the animation data in the standstill state, which is displayed at a predetermined position at a predetermined time, by using the number of frames calculated by said number-of-frames calculation unit and a function corresponding to the type of the animation in the moving state set by said interface unit, and to generate the animation in the moving state before generating another animation in the standstill state, a characteristic amount calculation unit operable to calculate a characteristic amount as an amount which is characteristic of the 3D character animation;

a camera control unit operable to calculate a position and a posture of a camera with respect to the animation data based on the characteristic amount calculated by said characteristic amount calculation unit so that the 3D character animation in the standstill state can be read; and a rendering unit operable to generate animated video of 3D characters by using the animation data and the camera position and posture calculated by said camera control unit.

16. The animated video generation apparatus of claim 15, wherein said camera control unit is operable to calculate the camera position and posture by using coordinates and a posture vector of the 3D characters in the standstill state.

17. The animated video generation apparatus of claim 15, wherein said camera control unit is operable to calculate a position and a posture of the camera by using coordinates and posture vectors of the 3D characters in a plurality of standstill states for each of the standstill states, and to calculate a position and a posture of the camera in the moving state by using a function for interpolating the camera positions and postures of the plurality of standstill states.

18. The animated video generation apparatus of claim 15, wherein said camera control unit is operable to calculate a position and a posture of the camera by using coordinates and posture vectors of 3D characters in a plurality of standstill states for each of the standstill states, and to calculate a position and a posture of the camera in moving state by using a function that is optimized by using an objective function based on generated animated video.

19. The animated video generation apparatus of claim 15, further comprising a composition unit operable to compose the 3D character animated video generated by said rendering unit on a predetermined area of a main video.

20. The animated video generation apparatus of claim 19, wherein said composition unit is operable to compose the 3D character animated video on an area of the main video other than an area which is not to be obstructed by the 3D character animated video.

21. An animated video generation method comprising:
- setting a time allocation between 3D character animations in a moving state and in a standstill state, and setting a type of the animation in the moving state;
- calculating the number of frames corresponding to an animation based on the set time allocation between the animations in the moving state and the standstill state; and
- generating data of the animation in the standstill state at a predetermined position at a predetermined time so that 3D characters can be read, and generating data of the 3D character animation in the moving state so as to reach and to link to the data of the animation in the standstill state, which is displayed at a predetermined position at a predetermined time, by using the number of frames calculated in said calculating of the number of frames and a function corresponding to the type of the animation in the moving state set in said setting of the type of the animation, and generating the animation in the moving state before generating another animation in the standstill state;
- calculating a characteristic amount as an amount which is characteristic of the 3D character animation;
- calculating a position and a posture of a camera with respect to the animation data based on the characteristic amount calculated by said calculating of the characteristic amount so that the 3D character of the animation in the standstill state can be read; and
- generating 3D character animated video by using the animation data and the camera position and posture calculated in said calculating of the position and the posture.

22. A computer-readable program storage medium that contains a program for making a computer execute:
- setting a time allocation between 3D character animations in a moving state and in a standstill state, and setting a type of the animation in the moving state;
- calculating the number of frames corresponding to an animation based on the set time allocation between the animations in the moving state and the standstill state; and
- generating data of the animation in the standstill state at a predetermined position at a predetermined time so that 3D characters can be read, and generating data of the 3D character animation in the moving state so as to reach and to link to the data of the animation in the standstill state, which is displayed at a predetermined position at a predetermined time, by using the number of frames calculated in said calculating of the number of frames and a function corresponding to the type of the animation in the moving state set in said setting of the type of the animation, and generating the animation in the moving state before generating another animation in the standstill state;
- calculating a characteristic amount as an amount which is characteristic of the 3D character animation;
- calculating a position and a posture of a camera with respect to the animation data based on the characteristic amount calculated by said calculating of the characteristic amount so that the 3D character of the animation in the standstill state can be read; and
- generating 3D character animated video by using the animation data and the camera position and posture calculated in said calculating of the position and the posture.

* * * * *